US012288298B2

(12) United States Patent
Moll

(10) Patent No.: US 12,288,298 B2
(45) Date of Patent: Apr. 29, 2025

(54) GENERATING USER INTERFACES DISPLAYING AUGMENTED REALITY GRAPHICS

(71) Applicant: Snap Inc., Santa Monica, CA (US)

(72) Inventor: Sharon Moll, Lachen (CH)

(73) Assignee: Snap Inc., Santa Monica, CA (US)

( * ) Notice: Subject to any disclaimer, the term of this patent is extended or adjusted under 35 U.S.C. 154(b) by 0 days.

(21) Appl. No.: 17/845,626

(22) Filed: Jun. 21, 2022

(65) Prior Publication Data

US 2023/0410441 A1 Dec. 21, 2023

(51) Int. Cl.
*G06F 3/01* (2006.01)
*G06F 3/04815* (2022.01)
*G06F 3/0482* (2013.01)
*G06T 3/40* (2006.01)
*G06T 7/20* (2017.01)
*G06T 7/70* (2017.01)
*G06T 19/00* (2011.01)

(52) U.S. Cl.
CPC ............ *G06T 19/006* (2013.01); *G06F 3/011* (2013.01); *G06F 3/04815* (2013.01); *G06F 3/0482* (2013.01); *G06T 3/40* (2013.01); *G06T 7/20* (2013.01); *G06T 7/70* (2017.01); *G06T 2200/24* (2013.01)

(58) Field of Classification Search
CPC ........... G06T 19/006; G06T 7/70; G06T 7/20; G06T 2200/24; G06F 3/011; G06F 3/04815; G06F 3/0482
See application file for complete search history.

(56) References Cited

U.S. PATENT DOCUMENTS

| 7,971,156 B2 | 6/2011 | Albertson et al. |
| 7,996,793 B2 | 8/2011 | Latta et al. |
| 8,487,938 B2 | 7/2013 | Latta et al. |

(Continued)

FOREIGN PATENT DOCUMENTS

| CN | 103049761 | 8/2016 |
| CN | 111966216 A | 11/2020 |

(Continued)

OTHER PUBLICATIONS

"Artivive—A resource for mobilizing the use of Artivive, an augmented reality art technology, to enhance and scale creative pedagogy.", [Online]. Retrieved from the Internet: <https://artsdesign.berkeley.edu/artivive>, (2021), 6 pgs.

(Continued)

*Primary Examiner* — Dennis P Joseph
(74) *Attorney, Agent, or Firm* — Schwegman Lundberg & Woessner, P.A.

(57) ABSTRACT

An Augmented Reality (AR) graphics system is provided. The AR graphics system may detect an object in a real-world scene that corresponds to an AR graphics display surface. The AR graphics system may generate AR graphics that are displayed as overlays of the AR graphics display surface. The AR graphics system may track the motion of a graphics input tool with respect to the AR graphics display surface to generate AR graphics based on the motion of the graphics input tool. The AR graphics may be comprised of a number of markings generated based on the motion of the graphics input tool.

20 Claims, 11 Drawing Sheets

(56) References Cited

U.S. PATENT DOCUMENTS

| | | |
|---|---|---|
| 8,856,691 B2 | 10/2014 | Geisner et al. |
| 9,225,897 B1 | 12/2015 | Sehn et al. |
| 9,230,160 B1 | 1/2016 | Kanter |
| 9,276,886 B1 | 3/2016 | Samaranayake |
| 9,384,578 B2 | 7/2016 | Friesen |
| 9,705,831 B2 | 7/2017 | Spiegel |
| 9,742,713 B2 | 8/2017 | Spiegel et al. |
| 10,102,423 B2 | 10/2018 | Shaburov et al. |
| 10,284,508 B1 | 5/2019 | Allen et al. |
| 10,439,972 B1 | 10/2019 | Spiegel et al. |
| 10,509,466 B1 | 12/2019 | Miller et al. |
| 10,509,865 B2 | 12/2019 | Hackett et al. |
| 10,514,876 B2 | 12/2019 | Sehn |
| 10,579,869 B1 | 3/2020 | Xiong et al. |
| 10,614,855 B2 | 4/2020 | Huang |
| 10,748,347 B1 | 8/2020 | Li et al. |
| 10,958,608 B1 | 3/2021 | Allen et al. |
| 10,962,809 B1 | 3/2021 | Castañeda |
| 10,996,846 B2 | 5/2021 | Robertson et al. |
| 10,997,787 B2 | 5/2021 | Ge et al. |
| 11,012,390 B1 | 5/2021 | Al Majid et al. |
| 11,030,454 B1 | 6/2021 | Xiong et al. |
| 11,036,368 B1 | 6/2021 | Al Majid et al. |
| 11,062,498 B1 | 7/2021 | Voss et al. |
| 11,087,728 B1 | 8/2021 | Canberk et al. |
| 11,092,998 B1 | 8/2021 | Castañeda et al. |
| 11,106,342 B1 | 8/2021 | Al Majid et al. |
| 11,126,206 B2 | 9/2021 | Meisenholder et al. |
| 11,143,867 B2 | 10/2021 | Rodriguez, II |
| 11,169,600 B1 | 11/2021 | Canberk et al. |
| 11,227,626 B1 | 1/2022 | Krishnan Gorumkonda et al. |
| 11,307,747 B2 | 4/2022 | Dancie et al. |
| 11,531,402 B1 | 12/2022 | Stolzenberg |
| 11,546,505 B2 | 1/2023 | Canberk |
| 2009/0012788 A1 | 1/2009 | Gilbert et al. |
| 2011/0301934 A1 | 12/2011 | Tardif |
| 2014/0078109 A1* | 3/2014 | Armstrong-Muntner ............... G06F 3/03542 345/173 |
| 2014/0171036 A1 | 6/2014 | Simmons |
| 2015/0040040 A1 | 2/2015 | Balan et al. |
| 2015/0120293 A1 | 4/2015 | Wohlert et al. |
| 2015/0269783 A1* | 9/2015 | Yun ................ G02B 27/0172 345/633 |
| 2015/0370320 A1 | 12/2015 | Connor |
| 2017/0123487 A1 | 5/2017 | Hazra et al. |
| 2017/0277684 A1 | 9/2017 | Dharmarajan Mary |
| 2017/0277685 A1 | 9/2017 | Takumi |
| 2017/0351910 A1 | 12/2017 | Elwazer et al. |
| 2017/0358141 A1 | 12/2017 | Stafford et al. |
| 2017/0371432 A1* | 12/2017 | Gavriliuc ............ G06F 3/0304 |
| 2018/0012412 A1 | 1/2018 | Scavezze et al. |
| 2018/0158370 A1 | 6/2018 | Pryor |
| 2019/0025590 A1 | 1/2019 | Haddick |
| 2019/0034765 A1 | 1/2019 | Kaehler et al. |
| 2021/0011612 A1 | 1/2021 | Dancie et al. |
| 2021/0034161 A1 | 2/2021 | Potts et al. |
| 2021/0074016 A1 | 3/2021 | Li et al. |
| 2021/0166732 A1 | 6/2021 | Shaburova et al. |
| 2021/0174034 A1 | 6/2021 | Retek et al. |
| 2021/0241529 A1 | 8/2021 | Cowburn et al. |
| 2021/0303075 A1 | 9/2021 | Cowburn et al. |
| 2021/0303077 A1 | 9/2021 | Anvaripour et al. |
| 2021/0303140 A1 | 9/2021 | Mourkogiannis |
| 2021/0382564 A1 | 12/2021 | Blachly et al. |
| 2021/0397000 A1 | 12/2021 | Rodriguez, II |
| 2021/0405761 A1 | 12/2021 | Canberk |
| 2022/0188539 A1 | 6/2022 | Chan et al. |
| 2022/0206588 A1 | 6/2022 | Canberk et al. |
| 2022/0254096 A1 | 8/2022 | Berliner et al. |
| 2022/0291753 A1* | 9/2022 | Erivantcev ............ G06F 3/0482 |
| 2022/0300730 A1 | 9/2022 | Eirinberg et al. |
| 2022/0300731 A1 | 9/2022 | Eirinberg et al. |
| 2022/0326781 A1 | 10/2022 | Hwang et al. |
| 2022/0334649 A1 | 10/2022 | Hwang et al. |
| 2023/0114043 A1* | 4/2023 | Wan ................ G06F 3/0482 345/633 |
| 2024/0282058 A1 | 8/2024 | Moll |

FOREIGN PATENT DOCUMENTS

| | | |
|---|---|---|
| EP | 3707693 | 9/2020 |
| KR | 20220158824 A | 12/2022 |
| WO | 2016168591 | 10/2016 |
| WO | 2019094618 | 5/2019 |
| WO | WO-2022005687 A1 | 1/2022 |
| WO | WO-2022005693 A1 | 1/2022 |
| WO | WO-2022060549 A2 | 3/2022 |
| WO | WO-2022066578 A1 | 3/2022 |
| WO | WO-2022132381 A1 | 6/2022 |
| WO | WO-2022146678 A1 | 7/2022 |
| WO | WO-2022198182 A1 | 9/2022 |
| WO | WO-2022216784 A1 | 10/2022 |
| WO | WO-2022225761 A1 | 10/2022 |
| WO | WO-2022245765 A1 | 11/2022 |
| WO | WO-2023250361 A1 | 12/2023 |
| WO | 2024177967 | 8/2024 |

OTHER PUBLICATIONS

"International Application Serial No. PCT/US2023/068794, International Search Report mailed Oct. 16, 2023", 4 pgs.

"International Application Serial No. PCT/US2023/068794, Written Opinion mailed Oct. 16, 2023", 5 pgs.

"International Application Serial No. PCT/US2024/016458, International Search Report mailed May 6, 2024", 3 pgs.

"International Application Serial No. PCT/US2024/016458, Written Opinion mailed May 6, 2024", 9 pgs.

U.S. Appl. No. 18/172,083, filed Feb. 21, 2023, Generating User Interfaces Displaying Augmented Reality Graphics.

"U.S. Appl. No. 18/172,083, Non Final Office Action mailed Sep. 23, 2024", 29 pgs.

* cited by examiner

GENERATING USER INTERFACES DISPLAYING AUGMENTED REALITY GRAPHICS

TECHNICAL FIELD

The present disclosure relates generally to the generating user interfaces displaying augmented reality graphics.

BACKGROUND

A head-worn device may be implemented with a transparent or semi-transparent display through which a user of the head-worn device can view the surrounding environment. Such devices enable a user to see through the transparent or semi-transparent display to view the surrounding environment, and to also see objects (e.g., virtual objects such as a rendering of a 2D or 3D graphic model, images, video, text, and so forth) that are generated for display to appear as a part of, and/or overlaid upon, the surrounding environment. This is typically referred to as "augmented reality" or "AR." A head-worn device may additionally completely occlude a user's visual field and display a virtual environment through which a user may move or be moved. This is typically referred to as "virtual reality" or "VR." As used herein, the term AR refers to either or both augmented reality and virtual reality as traditionally understood, unless the context indicates otherwise.

A user of the head-worn device may access and use a computer software application to perform various tasks or engage in an entertaining activity. To use the computer software application, the user interacts with a user interface provided by the head-worn device.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
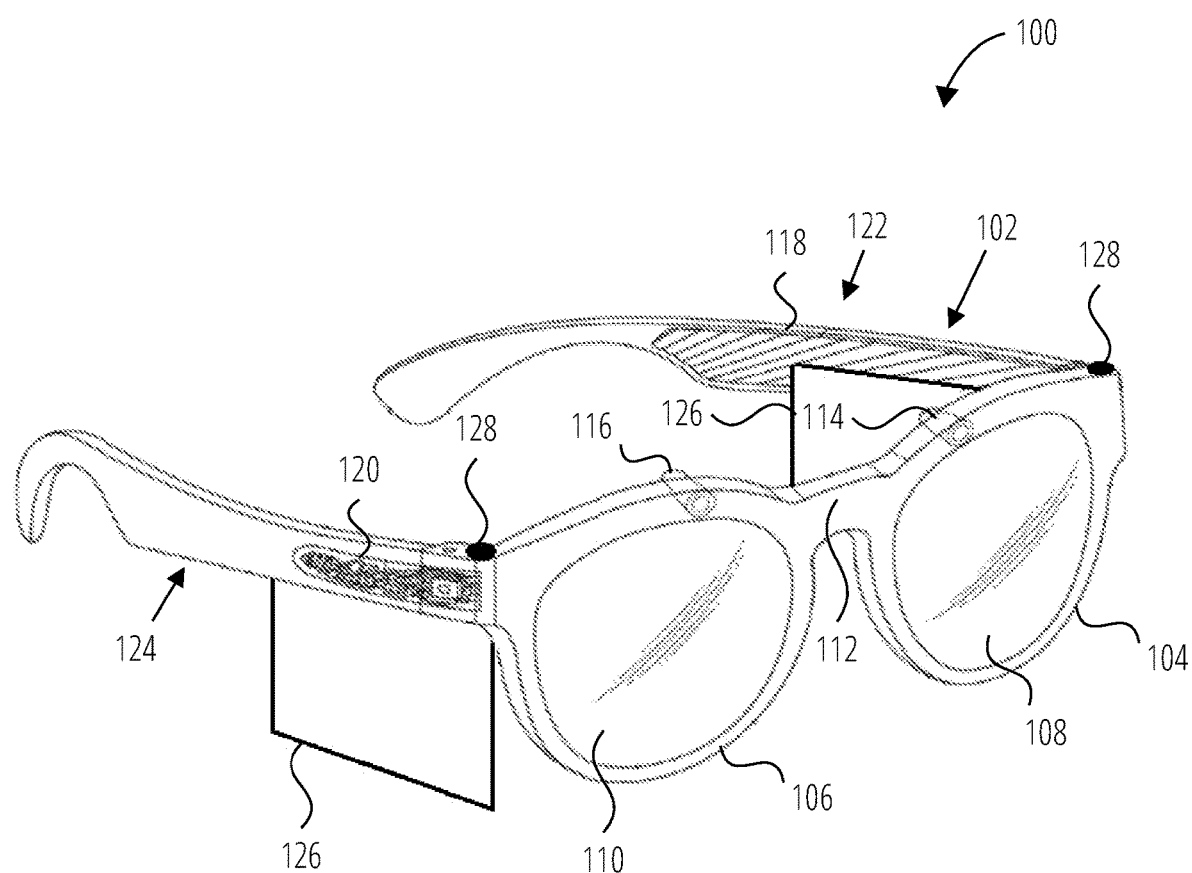
FIG. 1 is a perspective view of a head-worn device, in accordance with one or more examples.

In many augmented reality systems, users may interact with virtual objects that are displayed in their environment. An input modality that may be utilized with AR systems is hand-tracking combined with Direct Manipulation of Virtual Objects (DMVO) where a user is provided with a user interface that is displayed to the user in an AR overlay having a two-dimensional (2D) or three-dimensional (3D) rendering. The rendering is of a graphic model in 2D or 3D where virtual objects located in the model correspond to interactive elements of the user interface. In this way, the user perceives the virtual objects as objects within an overlay in the user's field of view of the real-world scene while wearing the AR system, or perceives the virtual objects as objects within a virtual world as viewed by the user while wearing the AR system. To allow the user to manipulate the virtual objects, the AR system detects the user's hands and tracks their movement, location, and/or position to determine the user's interactions with the virtual objects.

However, in existing systems, user interactions with virtual objects in an AR environment lack haptic feedback. To illustrate, as users touch and interact with virtual objects in an AR environment, there is typically no sensation being felt in a user's fingers, hands, or limbs in response to touching the virtual object. Thus, although users may see that a virtual object is being touched, without haptic feedback being provided in response to a user's interaction, the user's interaction with the virtual object may be awkward or result in frustration for the user. For example, it may be challenging for a user to gauge how a virtual object may move or otherwise react to their interaction with the virtual object.

Additionally, in scenarios where a state of a virtual object depends on a degree or amount of interaction with the virtual object, some interactions by a user may not activate a desired state of the virtual object. To illustrate, in situations where a user is attempting to write, paint, or draw on a virtual surface, in the absence of haptic feedback, the width of the stroke produced by the interaction of a user with an input tool, such as a pen, brush, stylus, or finger, may not correspond to a user's intended result. Thus, the graphics generated in response to these interactions may not correspond to the intended graphics. As a result, the user's experience in the AR environment would be different from the user's experience painting, drawing, or writing using physical tools that interact with physical media.

In at least some cases, drawing, writing, or painting functions may not be activated unless a particular state of a virtual object is activated based on proximity of the input tool with respect to the virtual object. For example, if an input tool is not touching a virtual object that is to be marked, the functionality to draw, paint, write, or otherwise mark on the virtual object may not be activated. However, without haptic feedback a user may be unable to gauge whether or not the input tool is touching the virtual object, resulting in the graphic being produced by the user's interactions with the virtual object being different from the intended graphic.

In one or more examples, implementations of an augmented reality graphics system may detect a surface in a real-world scene that may serve as an AR graphics display surface. The augmented reality graphics system may also detect a graphics input tool in the real-world scene and determine when the graphics input tool is within a threshold distance of the surface. In at least some examples, the augmented reality graphics system may determine when the graphics input tool is touching the surface. Drawing, writing, and/or painting functionality may be activated in response to the graphics input tool being within the threshold distance of the surface. The augmented reality graphics system may then track the motion of the graphics input tool and produce an augmented reality graphic that corresponds to the motion of the graphics input tool. In this way, a user may produce at least one of a drawing, a painting, handwriting, or a design using a physical surface in an environment, such as a wall, table, floor, etc., to produce a graphic without physically modifying the surface. That is, a user may create a painting using a surface included in an environment without actually applying paint to change the color of the surface.

By detecting a surface in a real-world scene and the motion of a graphics input tool in relation to the surface, a user may be provided with haptic feedback as the graphics input tool touches the surface. In this way, the markings produced by the use of the graphics input tool correspond more closely to the markings intended by the user than in situations where a virtual object is being used as a surface on which AR graphics are being produced. Additionally, in scenarios where an amount of pressure applied by a graphics input tool has an impact on an appearance of an AR graphic, such as when pressing a paintbrush harder on a surface causes a thicker marking to be made, the implementations described herein may also more accurately produce an AR graphic with the appearance intended by the user in relation to situations where a virtual object is being used as a surface on which AR graphics are being produced. Further, in situations where a state of an augmented reality content item is based on a proximity of the graphics input tool to a surface, implementations described herein may more accurately detect triggering conditions for activating a state of the augmented reality content item or the client application. In particular, the graphics input tool may change shape, such as a tip of a brush or finger bending, in response to touching a surface in a real-world scene. Thus, the accuracy of determining triggering conditions or selections of user interface elements that correspond to a location of a surface in a real-world environment may be more accurate and/or consume fewer computing and memory resources than in situations where the activation of a state or user interface element is based on proximity of a graphics input tool with a virtual object.

Other technical features may be readily apparent to one skilled in the art from the following figures, descriptions, and claims.

FIG. 1 is a perspective view of an AR system in a form of a head-worn device (e.g., glasses 100 of FIG. 1), in accordance with some examples. The glasses 100 can include a frame 102 made from any suitable material such as plastic or metal, including any suitable shape memory alloy. In one or more examples, the frame 102 includes a first or left optical element holder 104 (e.g., a display or lens holder) and a second or right optical element holder 106 connected by a bridge 112. A first or left optical element 108 and a second or right optical element 110 can be provided within respective left optical element holder 104 and right optical element holder 106. The right optical element 110 and the left optical element 108 can be a lens, a display, a display assembly, or a combination of the foregoing. Any suitable display assembly can be provided in the glasses 100.

The frame 102 additionally includes a left arm or temple piece 122 and a right arm or temple piece 124. In some examples the frame 102 can be formed from a single piece of material so as to have a unitary or integral construction.

The glasses 100 can include a computing device, such as a computer 120, which can be of any suitable type so as to be carried by the frame 102 and, in one or more examples, of a suitable size and shape, so as to be partially disposed in one of the temple piece 122 or the temple piece 124. The computer 120 can include one or more processors with memory, wireless communication circuitry, and a power source. As discussed below, the computer 120 comprises low-power circuitry, high-speed circuitry, and a display processor. Various other examples may include these elements in different configurations or integrated together in different ways. Additional details of aspects of computer 120 may be implemented as illustrated by the data processor 902 discussed below.

The computer 120 additionally includes a battery 118 or other suitable portable power supply. In some examples, the battery 118 is disposed in left temple piece 122 and is electrically coupled to the computer 120 disposed in the right temple piece 124. The glasses 100 can include a connector or port (not shown) suitable for charging the battery 118, a wireless receiver, transmitter or transceiver (not shown), or a combination of such devices.

The glasses 100 include a first or left camera 114 and a second or right camera 116. Although two cameras are depicted, other examples contemplate the use of a single or additional (i.e., more than two) cameras. In one or more examples, the glasses 100 include any number of input sensors or other input/output devices in addition to the left camera 114 and the right camera 116. Such sensors or input/output devices can additionally include biometric sensors, location sensors, motion sensors, and so forth.

In some examples, the left camera 114 and the right camera 116 provide video frame data for use by the glasses 100 to extract 3D information from a real-world scene.

The glasses 100 may also include a touchpad 126 mounted to or integrated with one or both of the left temple piece 122 and right temple piece 124. The touchpad 126 is generally vertically arranged, approximately parallel to a user's temple in some examples. As used herein, generally vertically aligned means that the touchpad is more vertical than horizontal, although potentially more vertical than that. Additional user input may be provided by one or more buttons 128, which in the illustrated examples are provided on the outer upper edges of the left optical element holder 104 and right optical element holder 106. The one or more touchpads 126 and buttons 128 provide a means whereby the glasses 100 can receive input from a user of the glasses 100.

Figure 2:
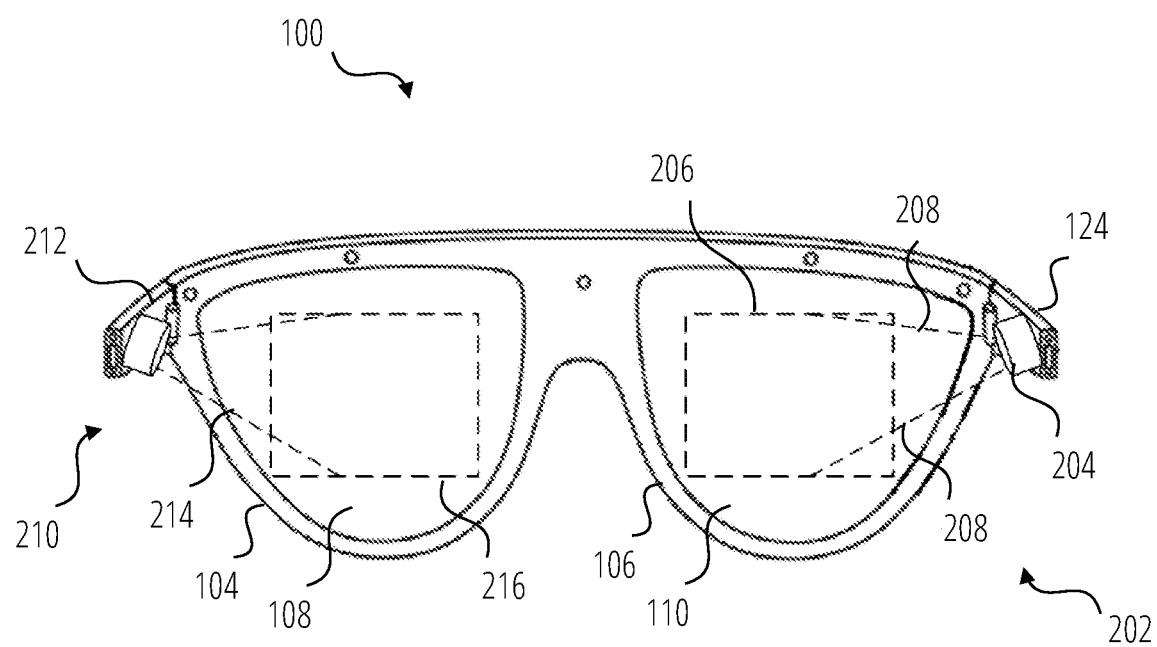
FIG. 2 is a further view of the head-worn device of FIG. 1, in accordance with one or more examples.

FIG. 2 illustrates the glasses 100 from the perspective of a user. For clarity, a number of the elements shown in FIG. 1 have been omitted. As described in FIG. 1, the glasses 100 shown in FIG. 2 include left optical element 108 and right optical element 110 secured within the left optical element holder 104 and the right optical element holder 106 respectively.

The glasses 100 include forward optical assembly 202 comprising a right projector 204 and a right near eye display 206, and a forward optical assembly 210 including a left projector 212 and a left near eye display 216.

In some examples, the near eye displays are waveguides. The waveguides include reflective or diffractive structures (e.g., gratings and/or optical elements such as mirrors, lenses, or prisms). Light 208 emitted by the projector 204 encounters the diffractive structures of the waveguide of the near eye display 206, which directs the light towards the right eye of a user to provide an image on or in the right optical element 110 that overlays the view of the real-world scene seen by the user. Similarly, light 214 emitted by the projector 212 encounters the diffractive structures of the waveguide of the near eye display 216, which directs the light towards the left eye of a user to provide an image on or in the left optical element 108 that overlays the view of the real-world scene seen by the user. The combination of a GPU, the forward optical assembly 202, the left optical element 108, and the right optical element 110 provide an optical engine of the glasses 100. The glasses 100 use the optical engine to generate an overlay of the real-world scene view of the user including display of a user interface to the user of the glasses 100.

It will be appreciated however that other display technologies or configurations may be utilized within an optical engine to display an image to a user in the user's field of view. For example, instead of a projector 204 and a waveguide, an LCD, LED or other display panel or surface may be provided.

In use, a user of the glasses 100 will be presented with information, content and various user interfaces on the near eye displays. As described in more detail herein, the user can then interact with the glasses 100 using a touchpad 126 and/or the buttons 128, voice inputs or touch inputs on an associated device (e.g., client device 926 illustrated in FIG. 9), and/or hand movements, locations, and positions detected by the glasses 100.

Figure 3:
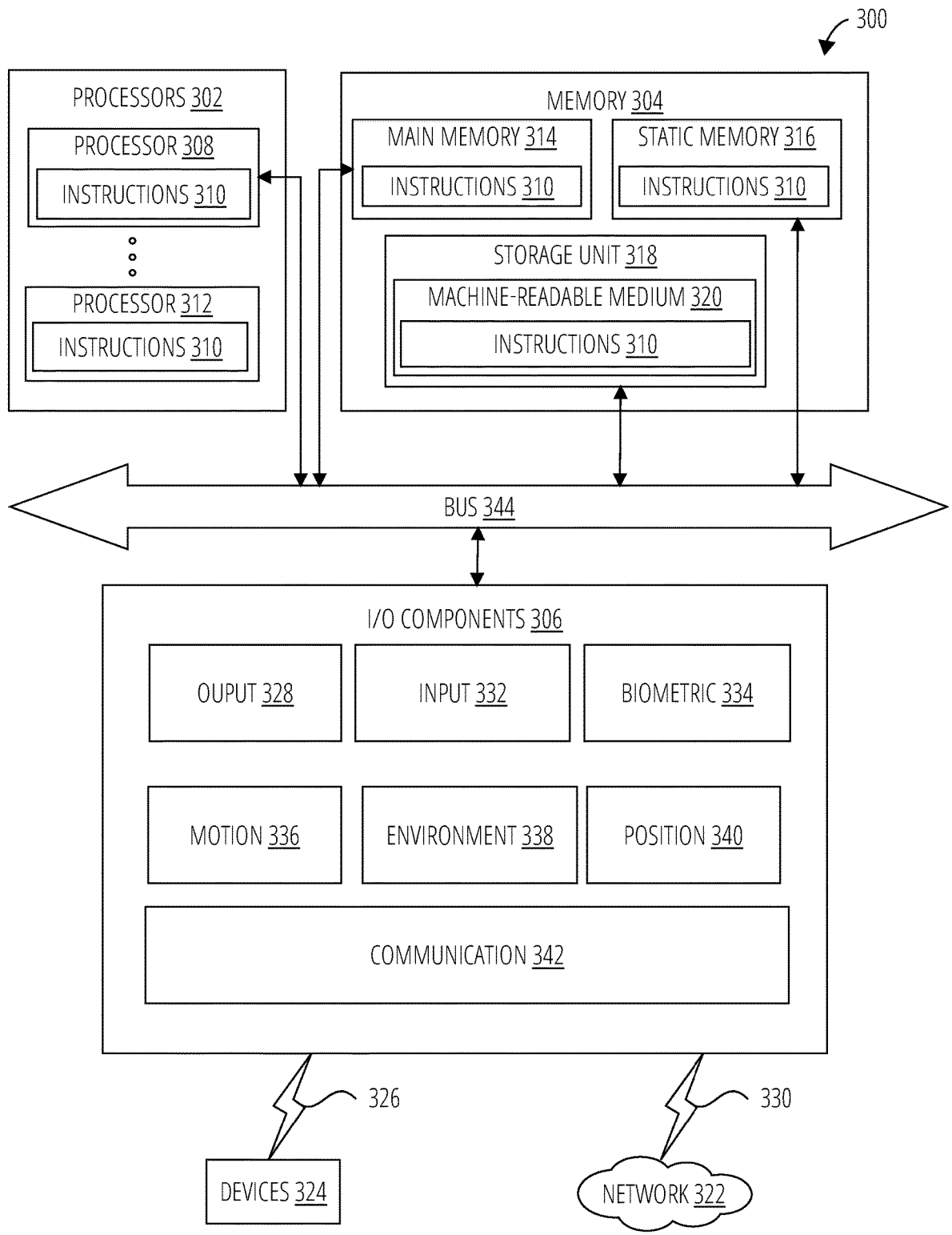
FIG. 3 is a diagrammatic representation of a machine, in the form of a computing apparatus within which a set of instructions may be executed for causing the machine to perform any one or more of the methodologies discussed herein in accordance with one or more examples.

FIG. 3 is a diagrammatic representation of a computing apparatus 300 within which instructions 310 (e.g., software, a program, an application, an applet, an app, or other executable code) for causing the computing apparatus 300 to perform any one or more of the methodologies discussed herein may be executed. The computing apparatus 300 may be utilized as a computer 120 of glasses 100 of FIG. 1. For example, the instructions 310 may cause the computing apparatus 300 to execute any one or more of the methods described herein. The instructions 310 transform the general, non-programmed computing apparatus 300 into a particular computing apparatus 300 programmed to carry out the described and illustrated functions in the manner described. The computing apparatus 300 may operate as a standalone device or may be coupled (e.g., networked) to other machines. In a networked deployment, the computing apparatus 300 may operate in the capacity of a server machine or a client machine in a server-client network environment, or as a peer machine in a peer-to-peer (or distributed) network environment. The computing apparatus 300 may comprise, but not be limited to, a server computer, a client computer, a personal computer (PC), a tablet computer, a laptop computer, a netbook, a set-top box (STB), a PDA, an entertainment media system, a cellular telephone, a smart phone, a mobile device, a head-worn device (e.g., a smart watch), a smart home device (e.g., a smart appliance), other smart devices, a web appliance, a network router, a network switch, a network bridge, or any machine capable of executing the instructions 310, sequentially or otherwise, that specify actions to be taken by the computing apparatus 300. Further, while a single computing apparatus 300 is illustrated, the term "machine" may also be taken to include a collection of machines that individually or jointly execute the instructions 310 to perform any one or more of the methodologies discussed herein.

The computing apparatus 300 may include processors 302, memory 304, and I/O components 306, which may be configured to communicate with one another via a bus 344. In some examples, the processors 302 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), another processor, or any suitable combination thereof) may include, for example, a processor 308 and a processor 312 that execute the instructions 310. The term "processor" is intended to include multi-core processors that may comprise two or more independent processors (sometimes referred to as "cores") that may execute instructions contemporaneously. Although FIG. 3 shows multiple processors 302, the computing apparatus 300 may include a single processor with a single core, a single processor with multiple cores (e.g., a multi-core processor), multiple processors with a single core, multiple processors with multiples cores, or any combination thereof.

The memory 304 includes a main memory 314, a static memory 316, and a storage unit 318, both accessible to the processors 302 via the bus 344. The main memory 304, the static memory 316, and storage unit 318 store the instructions 310 embodying any one or more of the methodologies or functions described herein. The instructions 310 may also reside, completely or partially, within the main memory 314, within the static memory 316, within machine-readable medium 320 within the storage unit 318, within one or more of the processors 302 (e.g., within the processor's cache memory), or any suitable combination thereof, during execution thereof by the computing apparatus 300.

The I/O components 306 may include a wide variety of components to receive input, provide output, produce output, transmit information, exchange information, capture measurements, and so on. The specific I/O components 306 that are included in a particular machine will depend on the type of machine. For example, portable machines such as mobile phones may include a touch input device or other such input mechanisms, while a headless server machine will likely not include such a touch input device. It will be appreciated that the I/O components 306 may include many other components that are not shown in FIG. 3. In various examples, the I/O components 306 may include output components 328 and input components 332. The output components 328 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 332 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In some examples, the I/O components 306 may include biometric components 334, motion components 336, environmental components 338, and position components 340, among a wide array of other components. For example, the biometric components 334 include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 336 may include inertial measurement units, acceleration sensor components (e.g., accelerometer), gravitation sensor components, rotation sensor components (e.g., gyroscope), and so forth. The environmental components 338 include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals associated to a surrounding physical environment. The position components 340 may include location sensor components (e.g., a GPS receiver component), altitude sensor components (e.g., altimeters or barometers that detect air pressure from which altitude may be derived), orientation sensor components (e.g., an Inertial Measurement Unit (IMU)), and the like.

Communication may be implemented using a wide variety of technologies. The I/O components 306 further include communication components 342 operable to couple the computing apparatus 300 to a network 322 or devices 324 via a coupling 330 and a coupling 326, respectively. For example, the communication components 342 may include a network interface component or another suitable device to interface with the network 322. In further examples, the communication components 342 may include wired communication components, wireless communication components, cellular communication components, Near Field Communication (NFC) components, Bluetooth® components (e.g., Bluetooth® Low Energy), WiFi® components, and other communication components to provide communication via other modalities. The devices 324 may be another machine or any of a wide variety of peripheral devices (e.g., a peripheral device coupled via a USB).

Moreover, the communication components 342 may detect identifiers or include components operable to detect identifiers. For example, the communication components 342 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 342, such as location via Internet Protocol (IP) geolocation, location via Wi-Fi® signal triangulation, location via detecting an NFC beacon signal that may indicate a particular location, and so forth.

The various memories (e.g., memory 304, main memory 314, static memory 316, and/or memory of the processors 302) and/or storage unit 318 may store one or more sets of instructions and data structures (e.g., software) embodying or used by any one or more of the methodologies or functions described herein. These instructions (e.g., the instructions 310), when executed by processors 302, cause various operations to implement the disclosed examples.

The instructions 310 may be transmitted or received over the network 322, using a transmission medium, via a network interface device (e.g., a network interface component included in the communication components 342) and using any one of a number of well-known transfer protocols (e.g., hypertext transfer protocol (HTTP)). Similarly, the instructions 310 may be transmitted or received using a transmission medium via the coupling 326 (e.g., a peer-to-peer coupling) to the devices 324.

Figure 4:
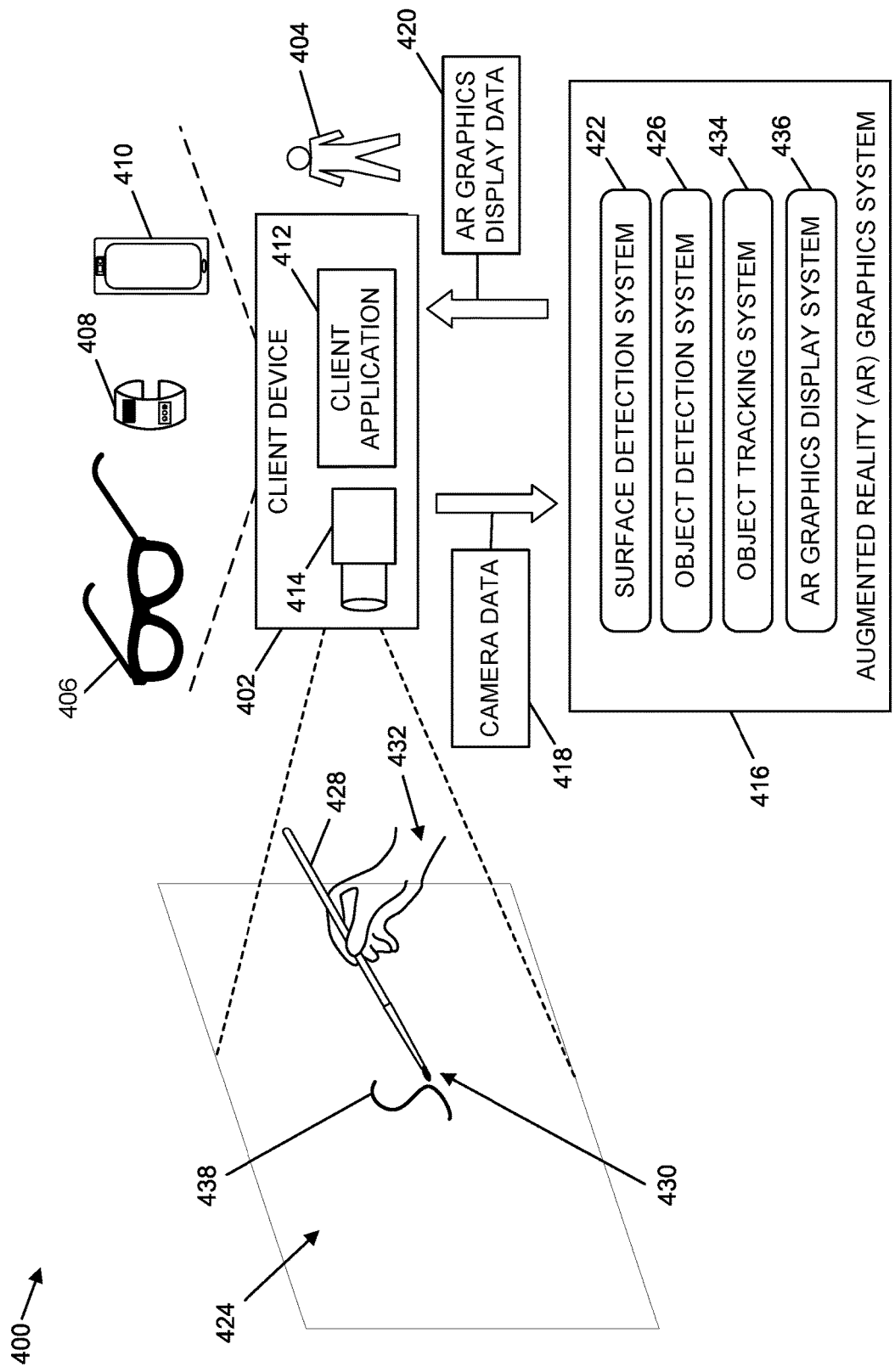
FIG. 4 is a diagram of an environment including a number of computing systems and devices to detect surfaces and cause user interfaces to be displayed with respect to the surfaces that include augmented reality graphics, in accordance with one or more examples.

FIG. 4 is a diagram of an environment 400 including a number of computing systems and devices to detect surfaces and cause user interfaces to be displayed with respect to the surfaces that include augmented reality graphics, in accordance with one or more examples. The environment 400 may include a client device 402. The client device 402 may be operated by a user 404. The client device 402 may include a number of computing devices having processing resources and memory resources. For example, the client device 402 may include at least one of a head-worn device 406, a wearable device 408, or a mobile computing device 410, such as a smart phone. In various examples, the client device 402 may include multiple computing devices that operate in conjunction with one another. To illustrate, the head-worn device 406 may operate in conjunction with at least one of the wearable device 408 or the mobile computing device 410 or the wearable device 408 may operate in conjunction with the mobile computing device 410. In one or more illustrative examples, the client device 402 may include the glasses 100 of FIG. 1.

The processing resources and the memory resources of the client device 402 may execute a number of applications, such as client application 412. In one or more examples, the client application 412 may include messaging functionality that enables users of the client application 412 to send messages to and receive messages from other users of the client application 412. In one or more additional examples, the client application 412 may include social networking functionality that enables users of the client application 412 to share content with other users of the client application 412 and/or to access content created by other users of the client application 412. In one or more illustrative examples, the client application 412 may include at least one of the messaging client 1002 or the application 1004 described in more detail with respect to FIG. 10.

The client device 402 may also include one or more cameras, such as camera 414. Camera 414 may capture images of an environment in which the client device 402 is located. In one or more examples, the camera 414 may capture video of an environment in which the client device 402 is located. The video may comprise at least one of a series of images or a stream of images captured during a period of time. In various examples, the camera 414 may capture video of a real-world scene in response to input from the user 404. The images captured by the camera 414 may be within a field of view of the camera 414. The field of view may correspond to a portion of an environment that may be imaged by the camera 414 at a given time and may be based on focal length of a lens of the camera 414 and a size of a sensor of the camera 414. Although not shown in the illustrative example of FIG. 4, the client device 402 may also include a number of audio capture devices. To illustrate, the client device 402 may include a number of microphones to capture audio content produced in an environment in which the client device 402 is located. In various examples, the client device 402 may include one or more microphones to capture audio content in conjunction with video content captured by the camera 414.

The environment 400 may also include an augmented reality (AR) graphics system 416. The AR graphics system 416 may generate augmented reality graphics that are displayed in an environment in which the client device 402 is located. For example, the AR graphics system 416 may generate augmented reality graphics that are generated within a real-world scene captured by the camera 414. The augmented reality graphics and the real-world scene may be visible via a display device of the client device 402, but the augmented reality graphics may not be visible outside of the display device of the client device 402. Although the AR graphics system 416 is shown outside of the client device 402 in the illustrative example of FIG. 4, in one or more implementations, at least a portion of the operations performed by the AR graphics system 416 may be executed by the client device 402. In one or more illustrative examples, the client device 402 may include at least a portion of the AR graphics system 416.

The augmented reality graphics may be generated in conjunction with an augmented reality content item. Augmented reality content items may include program code that is executable to perform one or more functions. In various examples, augmented reality content items may be executable within the client application 412. For example, an instance of the client application 412 may be activated by the client device 402 and one or more user interfaces of the client application 412 may be displayed via the client device 402. Augmented reality content items may be selected while viewing one or more user interfaces of the client application 412 and executed to activate one or more functions that correspond to the selected augmented reality content item.

In one or more examples, augmented reality content items may be executable to modify an appearance of one or more objects included in an image captured by the camera 414. To illustrate, an augmented reality content item may be executable to alter an appearance of a face included in an image captured by the camera 414. Additionally, an augmented reality content item may be executable to generate one or more augmented reality graphics in relation to one or more objects included in an image captured by the camera 414. In one or more illustrative examples, an augmented reality content item may be executable to cause a crown to appear on a head of an individual included in an image captured by the camera 414. Further, an augmented reality content item may be executable to generate one or more animations in relation to one or more objects included in an image captured by the camera 414. In one or more additional illustrative examples, an augmented reality content item may be executable to cause stars to circle above a head of an individual included in an image captured by the camera 414. In one or more further illustrative examples, an augmented reality content item may be executable to display information obtained from one or more sources. For example, an augmented reality content item may be executable to display movie times and locations within one or more user interfaces of the client application 412.

In one or more examples, the AR graphics system 416 may obtain camera data 418 generated by the camera 414. The camera data 418 may include one or more images captured by the camera 414 of a real-world scene. The AR graphics system 416 may analyze the camera data 418 to generate AR graphics display data 420. The AR graphics display data 420 may include one or more AR graphics that are displayed in conjunction with one or more objects included in a real-world scene captured by the camera 414. In one or more illustrative examples, the AR graphics display data 420 may at least one of include or be used to generate user interface data that corresponds to one or more user interfaces that include the AR graphics display data 420. In various examples, operations of the AR graphics system 416 may be performed in response to activation of an augmented reality content item of the client application 412.

The AR graphics system 416 may include a surface detection system 422 that may detect one or more surfaces included in the camera data 418. The surface detection system 422 may analyze the camera data 418 to determine one or more target objects that may correspond to a surface. For example, the surface detection system 422 may analyze the camera data 418 to identify objects having a number of characteristics. To illustrate, the surface detection system 422 may analyze the camera data 418 to identify objects having one or more shapes, one or more dimensions, one or more colors, one or more textures, one or more combinations thereof, and so forth. In various examples, the characteristics of target objects may correspond to characteristics of AR graphics display surfaces. In one or more examples, AR graphics display surfaces may have characteristics that are conducive to writing, drawing, painting, marking, one or more combinations thereof, and the like. In one or more illustrative examples, AR graphics display surfaces may have at least minimum dimensions, such as a minimum length and a minimum width, and/or maximum dimensions, such as a maximum length or a maximum width. In one or more illustrative examples, AR graphics display surfaces may have one or more textures. In various examples, AR graphics display surfaces may have a relatively flat texture or less than a maximum amount of surface roughness. In one or more additional illustrative examples, AR graphics display surfaces may have one or more colors that are conducive to the display of at least one of writing, drawing, painting, or other marking. In one or more further illustrative examples, the surface detection system 422 may analyze the camera data 418 to identify at least one of at least a portion of a wall, at least a portion of a floor, at least a portion of a table, at least a portion of a canvas, at least a portion of a whiteboard, at least a portion of a screen, or at least a portion of another surface on which AR graphics may be displayed plainly. In the illustrative example of FIG. 4, the surface detection system 422 may analyze the camera data 418 to identify an AR graphics display surface 424.

In situations where multiple target objects correspond to AR graphics display surfaces, the surface detection system 422 may analyze the camera data 418 to determine a candidate object that is most likely to be an AR graphics display surface. For example, the surface detection system 422 may determine rankings of candidate objects based on the characteristics of the candidate objects with respect to one or more criteria that are representative of AR graphics display surfaces. In these scenarios, the surface detection system 422 determines a candidate object having a highest ranking to be the AR graphics display surface 424. In various examples, the surface detection system 422 may evaluate values of individual candidate objects with respect to specified values of characteristics of AR graphics display surfaces to determine a respective score for the individual candidate objects. The score may indicate an amount of similarity between the values of the characteristics of the candidate objects and the values of the characteristics of one or more predetermined AR graphics display surfaces. In one or more illustrative examples, the scores for the individual candidate objects may be used to rank the individual candidate objects with respect to one another.

In one or more additional examples, the surface detection system 422 may analyze additional input to identify AR graphics display surfaces. For example, the surface detection system 422 may analyze the camera data 418 in conjunction with data indicating a direction of a gaze of the user 404 to identify the AR graphics display surface 424. To illustrate, in situations where the surface detection system 422 analyzes the camera data 418 to determine a number of candidate AR graphics display surfaces, the surface detection system 422 may also analyze at least one of an orientation or a location of at least one of the camera 414 or the client device 402 to determine a direction of a gaze of the user 404. In various examples, the surface detection system 422 may determine a candidate AR graphics display surface that aligns with the gaze of the user 404 to identify the AR graphics display surface 424. In one or more further examples, the surface detection system 422 may identify the AR graphics display surface 424 based on input received from the user 404. In one or more examples, the AR graphics display surface 424 may appear in a user interface generated by the client device 402 in which a user interface element is present that may be actuated to select the AR graphics display surface 424.

The AR graphics system 416 may also include an object detection system 426 to analyze the camera data 418 to identify one or more additional objects included in the camera data 418. In one or more examples, the object detection system 426 may analyze the camera data 418 to identify a graphics input tool 428 within the field of view of the camera 414. The graphics input tool 428 may include a device that may be used to at least one of write, draw, or paint. In one or more illustrative examples, the graphics input tool 428 may include a paint brush. In at least some examples, paint is absent from the paint brush. In one or more additional examples, the graphics input tool 428 may include a stylus. In one or more further examples, the graphics input tool 428 may include a finger. Additionally, the object detection system 426 may analyze the camera data 418 to identify a tip 430 of the graphics input tool 428. Further, the object detection system 426 may analyze the camera data 418 to identify a hand 432 in the field of view of the camera 414. In one or more examples, the object detection system 426 may analyze the camera data 418 to identify a hand 432 that is holding the graphics input tool 428.

In one or more examples, the object detection system 426 may analyze the camera data 418 to determine at least one of a number of edges, a number of contours, or a number of shapes that may individually or in combination correspond to an object. In various examples, the object detection system 426 may determine one or more target regions that correspond to at least a portion of an object in a real-world scene. In at least some examples, the object detection system 426 may identify one or more objects in a scene based on an amount of similarity between features included in a target region and features of one or more objects included in template images. The template images may include images that were previously captured and include one or more objects of interest. The template images may be used for comparisons with subsequently captured images to identify objects of interest. In one or more illustrative examples, the object detection system 426 may implement one or more machine learning techniques to identify objects included in a scene, such as at least one of the graphics input tool 428, the tip 430 of the graphics input tool 428, or the hand 432. In one or more additional illustrative examples, the object detection system 426 may determine a group of pixels included in one or more images captured by the camera 414 that correspond to an object of interest, such as at least one of the graphics input tool 428, the tip 430 of the graphics input tool, or the hand 432.

Additionally, the AR graphics system 416 may include an object tracking system 434. The object tracking system 434 may analyze the camera data 418 determine a path of motion of one or more objects included in a field of view of the camera 414. For example, the object tracking system 434 may analyze the camera data 418 to determine a path of motion of at least one of the graphics input tool 428, the tip 430 of the graphics input tool 428, or the hand 432. The object tracking system 434 may determine a path of motion of an object of interest by analyzing the camera data 418 using one or more differential techniques to determine differences in position of objects between a number of images included in the camera data 418. In one or more additional examples, the object tracking system 434 may determine a path of motion of an object of interest by determining a background included in a number of images of the camera data 418 and determining changes in location of portions of the number of images that are not included in the background. In various examples, the object tracking system 434 may analyze intensities of pixels included in a number of images included in the camera data 418 to determine a path of motion of one or more objects of interest, such as at least one of the graphics input tool 428, the tip 430 of the graphics input tool, or the hand 432.

Further, the AR graphics system 416 may include an AR graphics display system 436. The AR graphics display system 436 may use data generated by at least one of the surface detection system 422, the object detection system 426, or the object tracking system 434 to generate AR graphics. In one or more examples, the AR graphics display system 436 may generate user interface data that corresponds to one or more user interfaces that include the AR graphics. In various examples, the AR graphics generated by the AR graphics display system 436 may correspond to motion of at least one of the graphics input tool 428, the tip 430 of the graphics input tool 428, or the hand 432. In at least some examples, the AR graphics display system 436 may generate AR graphics that correspond to at least one of writing, drawing, painting, or another type of marking.

In one or more illustrative examples, the AR graphics display system 436 may determine a location for AR graphics to be displayed based on a location of the AR graphics display surface 424. In one or more examples, the surface detection system 422 may generate coordinates in real world space that correspond to the AR graphics display surface 424 and provide the coordinates in real world space to the AR graphics display system 436. In various examples, the coordinates in real world space obtained by the AR graphics display system 436 may correspond to boundaries of the AR graphics display surface 424 and cause AR graphics to be generated and displayed within the boundaries of the AR graphics display surface 424. The AR graphics generated by the AR graphics display system 436 may be included in a user interface that is displayed as an overlay of the AR graphics display surface 424.

Additionally, the AR graphics display system 436 may obtain a path of motion of at least one of the graphics input tool 428, the tip 430 of the graphics input tool 428, or the hand 432 from the object tracking system 434. The AR graphics display system 436 may generate AR graphics that correspond to the path of motion of at least one of the graphics input tool 428, the tip 430 of the graphics input tool 428, or the hand 432. In one or more illustrative examples, as the tip 430 of the graphics input tool 428 moves within the boundaries of the AR graphics display surface 424, the AR graphics display system 436 may cause markings to be displayed within a user interface, where the markings correspond to the motion of the tip 430 of the graphics input tool 428. In this way, the AR graphics display system 436 may cause an AR graphic 438 to be displayed in a user interface that includes the AR graphics display surface 424.

The AR graphics generated by the AR graphics display system 436 may have one or more colors. In various examples, a color of a marking generated by the AR graphics display system 436 may be selected from a menu of colors based on input from the user 404. For example, the AR graphics display system 436 may generate a user interface that includes a menu including a number of user interface elements that correspond to different colors that may be used to generate AR graphics. In response to selection of a user interface element that corresponds to a given color, the AR graphics display system 436 may generate AR graphics having the selected color in accordance with motion of the tip 430 of the AR graphics input tool 428.

The AR graphics display system 436 may also generate markings of AR graphics based on additional input provided by the user 404. For example, the AR graphics display system 436 may generate a user interface that includes a menu including a number of line widths. In these scenarios, the AR graphics display system 436 displays AR graphics comprised of one or more markings having widths selected by the user 404. In one or more additional examples, the widths of marking generated by the AR graphics display system 436 may be based on a state of the tip 430 of the AR graphics input tool 428. To illustrate, as the tip 430 is bent to a greater extent, the thickness of a marking generated by the AR graphics display system 436 may increase. In one or more illustrative examples, the tip 430 may be associated with a first state that corresponds to a first amount of bending of the tip 430 and is related to a first marking width, a second state the corresponds to a second amount of bending of the tip 430 and is related to a second marking width, and a third state that corresponds to a third amount of bending of the tip 430 and is related to a third marking width. In various examples, the second amount of bending may be greater than the first amount of bending and the third amount of bending may be greater than the second amount of bending. In these instances, the second marking width may be thicker than the first marking width and the third marking width may be thicker than the second marking width.

In one or more examples, the AR graphics display system 436 may detect input indicating that at least a portion of the AR graphic 438 is to be erased. In addition, the AR graphics display system 436 may detect input to apply one or more additional augmented reality content items to a user interface including the AR graphic 438. For example, the AR graphics display system 436 may display a menu including a number of user interface elements that are selectable to execute one or more additional augmented reality content items. In various examples, the one or more additional augmented reality content items may cause an additional, predetermined graphic to be displayed in a user interface in conjunction with the AR graphic 438. Further, the one or more additional augmented reality content items may cause an animation to be displayed in a user interface in conjunction with the AR graphic 438.

In at least some examples, the AR graphics display system 436 may cause the AR graphic 438 to be saved in at least one of memory of the client device 402 or a data storage device that is remotely located with respect to the client device 402. The saved AR graphic 438 may be reproduced in response to detection of the AR graphics display surface 424. For example, the surface detection system 422 may determine that the AR graphics display surface 424 is no longer detected within the field of view of the camera 414. To illustrate, the user 404 may move at least a threshold distance away from the AR graphics display surface 424 or turn the client device 402 such that the camera 414 is no longer pointed in a manner that the AR graphics display surface 424 is within the field of view of the camera 414. In these situations, the AR graphic 438 is removed from a user interface displayed by the AR graphics display system 436. The surface detection system 422 may, at another time, determine that the AR graphics display surface 424 has returned to the field of view of the camera 414. As a result, the AR graphics display system 436 may cause the AR graphic 438 to be re-displayed in a user interface that includes the AR graphics display surface 424. In various examples, the AR graphics display system 436 may cause the AR graphic 438 to be displayed in a user interface in response to the surface detection system 422 determining that at least a minimum amount of the AR graphics display surface 424 is within the field of view of the camera 414.

In one or more additional examples, the AR graphics display system 436 may detect input to cause the AR graphic 438 to be displayed in a user interface that includes the AR graphics display surface 424. In one or more additional examples, the AR graphics display system 436 may detect input to display the AR graphic 438 on one or more additional surfaces. To illustrate, the client application 412 may cause a user interface to be displayed that includes a user interface element that is selectable to view one or more AR graphics generated using the client application 412. Individual AR graphics may be associated with one or more additional user interface elements that are selectable to cause the respective AR graphics to be displayed in a user interface that includes one or more surfaces located in a field of view of the camera 414. In various examples, the client application 412 may also generate one or more user interfaces that enable the user 404 to include the AR graphic 438 in one or more messages. The one or more messages may be sent to other users of the client application 412. In one or more further examples, the client application 412 may generate one or more user interfaces that enable the user 404 to share the AR graphic 438 with individuals included in a social network of the user 404. For example, the client application 412 may generate one or more user interfaces that include user interface elements that are selectable to enable the user 404 to include the AR graphic 438 in a social media post or story.

Figure 5:
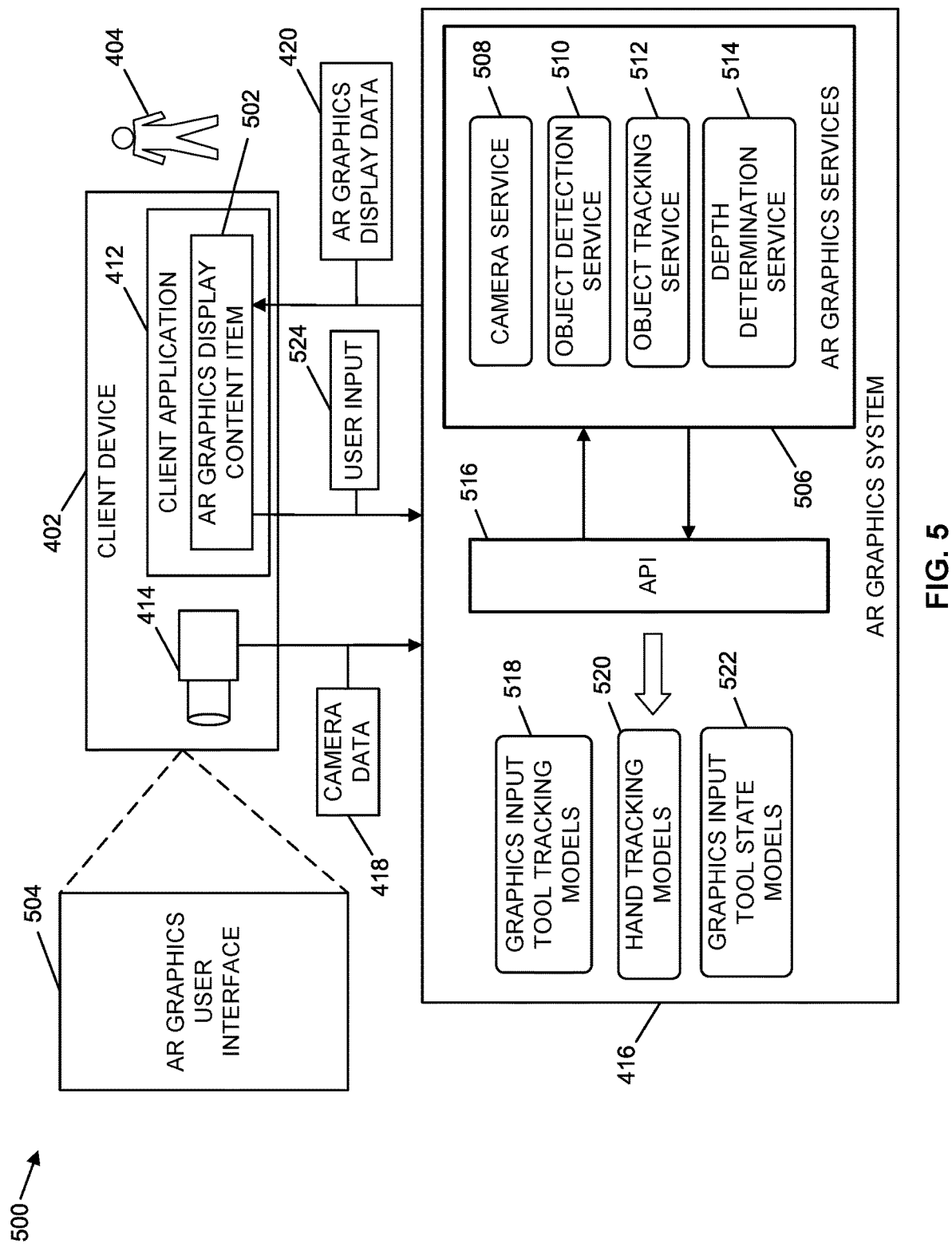
FIG. 5 is a diagram of an architecture including a number of computational components to generate user interfaces that display augmented reality graphics with respect to a surface based on detecting and tracking motion of a graphics input tool, in accordance with one or more examples.

FIG. 5 is a diagram of an architecture 500 including a number of computational components to generate user interfaces that display augmented reality graphics with respect to a surface based on detecting and tracking motion of a graphics input tool, in accordance with one or more examples. The architecture 500 may include the client device 402 that is operated by the user 404. The client device 402 may execute an instance of the client application 412. The client device 402 may also include the camera 414 that generates the camera data 418. The client device 402 may provide the camera data 418 to the AR graphics system 416. The AR graphics system 416 may analyze the camera data 418 to generate AR graphics display data 420. In various examples, at least a portion of the operations performed by the AR graphics system 416 may be performed by the client device 402. In one or more additional examples, at least a portion of the operations performed by the AR graphics system 416 may be performed by one or more additional computing devices that are located remotely with respect to the client device 402.

The AR graphics display data 420 may correspond to one or more AR graphics that are displayed within user interfaces generated by the client application 412. In one or more examples, the AR graphics display data 420 may be generated in conjunction with an AR graphics display content item 502. The AR graphics display content item 502 may include computer-readable code that is executable to activate features of the AR graphics system 416 to produce AR graphics that may be displayed in one or more user interfaces of the client application 412. For example, the AR graphics display content item 502 may be executable to cause AR graphics to be displayed in an AR graphics user interface 504. In one or more illustrative examples, the AR graphics display content item 502 may be executable to display AR graphics in the AR graphics user interface 504 as an overlay of one or more AR graphics display surfaces, such as the AR graphics display surface 424 of FIG. 4.

The AR graphics system 416 may include AR graphics services 506. The AR graphics services 506 may perform a number of computational operations to analyze the camera data 418 in order to generate the AR graphics display data 420. In at least some examples, the AR graphics services 506 may implement one or more machine learning technologies. In one or more examples, the AR graphics services 506 may be activated in response to activation of the AR graphics display content item 502.

The AR graphics services 506 may include a camera service 508 that obtains the camera data 418. For example, the camera service 508 may obtain a number of images captured by the camera 414, such as a number of video frames captured by the camera 414. In one or more examples, the camera service 508 may continuously receive the camera data 418 for a period of time. In various examples, the camera services 508 may obtain the camera data 418 during a period of time that the AR graphics display content item 502 is activated. In one or more additional examples, the camera service 508 may be activated and deactivated in response to user input received via the AR graphics display content item 502. In at least some examples, the camera service 508 may make the camera data 418 available to one or more additional components of the AR graphics services 506.

The AR graphics services 506 may also include an object detection service 510. The object detection service 510 may obtain the camera data 418 from the camera service 508. In one or more examples, the object detection service 510 may analyze the camera data 418 to identify one or more objects in a real world scene. The object detection service 510 may analyze the camera data 418 to identify at least a portion of a graphics input tool that may be used to generate markings that comprise an AR graphic displayed in the AR graphics user interface 504. The object detection service 510 may also analyze the camera data 418 to determine one or more AR graphics display surfaces within a real-world scene that corresponds to the camera data 418. Additionally, the object detection service 510 may analyze the camera data 418 to identify one or more additional objects included in a real-world scene, such as a hand of the user 404, a finger of the user 404, or a portion of an arm of the user 404.

In one or more examples, the object detection service 510 may implement one or more artificial neural networks to analyze the camera data 418 to identify objects within a real-world scene. For example, the object detection service 510 may implement one or more convolutional neural networks with respect to the camera data 418 to identify objects within a real-world scene. In addition, the object detection service 510 may implement one or more classification machine learning techniques to analyze the camera data 418 to identify one or more objects in a real-world scene. To illustrate, the object detection service 510 may implement one or more support vector machines with respect to the camera data 418 to identify one or more objects in a real-world scene.

In one or more illustrative examples, the object detection service 510 may analyze the camera data 418 to determine a number of at least one of contours, edges, or shapes that may be used to determine one or more candidate regions that may include one or more objects of interest, such as a graphics input tool, an AR graphics display surface, a tip of the graphics input tool, a finger, or one or more combinations thereof. The object detection service 510 may also implement a convolutional neural network to extract features from the one or more candidate regions. Additionally, the object detection service 510 may implement one or more support vector machines to classify one or more objects included in the one or more candidate regions based on the features extracted from the one or more candidate regions by the convolutional neural network. In various examples, the one or more machine learning techniques implemented by the object detection service 510 may be training using previously captured images that include one or more of the objects of interest and are labeled as including the one or more objects of interest.

The AR graphics services 506 may also include an object tracking service 512 that may detect movement of one or more of the objects of interest identified by the object detection service 510. In one or more examples, the object tracking service 512 may implement one or more trackers that determine movement of one or more of the objects of interest within frames of the camera data 418. In various examples, the object tracking service 512 may label an object of interest as an object to be tracked and determine differences in location of the labeled object of interest within a number of video frames. In one or more illustrative examples, the object tracking service 512 may implement one or more of convolutional neural networks, recurrent neural networks, autoencoders, or generative adversarial networks to track the motion of objects of interest across video frames.

Additionally, the AR graphics services 506 may include a depth determination service 514 that determines a distance between one or more objects included in the camera data 418 and the camera 414. In various examples, the depth determination service 514 may determine coordinates in real world space for one or more objects included in a real-world scene that corresponds to the camera data 418. In one or more illustrative example, the depth determination service 514 may use data obtained from multiple cameras of the client device 402 to determine the coordinates in real world space. In one or more additional illustrative examples, the depth determination service 514 may implement one or more convolutional neural networks to determine coordinates in real world space for one or more objects of interest included in the camera data 414. The one or more convolutional neural networks may be trained using images including objects that have been labeled as being various distances from the one or more cameras that captured the training images.

Further, the AR graphics system 416 may implement an application programming interface (API) 516. The API 516 may include a number of calls that may be used to obtain information generated by the AR graphics services 506. For example, one or more first calls of the API 516 can be provided to obtain information from the camera service 508. In addition, one or more second calls of the API 516 can be provided to obtain information from the object detection service 510. Further, one or more third calls of the API 516 can be provided to obtain information from the object tracking service 512. In various examples, one or more fourth calls of the API 516 calls may be provided to obtain information from the depth determination service 514.

In the illustrative example of FIG. 5, calls of the API 516 may be used to provide information generated by the AR graphics services 506 to one or more computational models. For example, the AR graphics system 416 may include one or more graphics input tool tracking models 518. In one or more examples, the graphics input tool tracking models 518 may be implemented to determine a location of a graphics input tool with respect to an AR graphics display surface. In various examples, the one or more graphics input tool tracking models 518 may use one or more calls of the API 516 to obtain information from the object detection service 510 and the object tracking service 512 to track the location of the graphics input tool with respect to the AR graphics display surface. The one or more graphics input tool tracking models 518 may use the location of the graphics input tool to determine locations of markings of an AR graphic to be displayed in the AR graphics user interface 504 with respect to the AR graphics display surface.

In addition, the AR graphics system 416 may include one or more hand tracking models 520. The one or more hand tracking models 520 may be implemented to determine a location of a hand of users of graphic input tools. The one or more hand tracking models 520 may use one or more calls of the API 516 to obtain information from the object detection service 510 and the object tracking service 512 to track the location of a hand of the user 404 that is holding a graphics input tool, such as a paint brush, a stylus, another marking implement, and the like. By tracking the movement of a hand of the user 404 that is holding a graphics input tool, additional information may be obtained to improve the accuracy of the location of markings formed in response to motion of the graphics input tool held by the hand of the user 404. For example, not only may the accuracy of the location of the graphics input tool be increased by detecting and tracking the motion of the hand of the user 404 that is holding the graphics input tool, but the angle at which the graphics input tool is being held may have an effect on the appearance of markings generated in response to motion of the graphics input tool and in response to motion of the hand of the user 404.

Further, the AR graphics system 416 may include one or more graphics input tool state models 522. The one or more graphics input tool state models 522 may be implemented to determine a state of the graphics input tool used to generate markings displayed in the AR graphics user interface 504 with respect to an AR graphics display surface. The state of the graphics input tool may impact characteristics of the markings produced in response to motion of the graphics input tool. The state of the graphics input tool may also correspond to whether or not marking functionality of the AR graphics display content item 502 has been activated. In various examples, the one or more graphics input tool state models 522 may use one or more calls of the API 516 to obtain information from the object detection service 510, the object tracking service 512, and the depth determination service 514.

For example, the graphics input tool may include a paint brush and an amount of bending of the tip of the paint brush may correspond to a width of markings displayed in response to motion of the graphics input tool. The one or more graphics input tool state models 522 may obtain information from at least one of the object detection service 510 or the depth determination service 514 to determine an amount of bending of the tip of the paint brush in response to contact with the AR graphics display surface. In at least some examples, one or more first amounts of bending of the tip of the paint brush may correspond to one or more first widths of markings displayed in the AR graphics user interface 504, one or more second amounts of bending of the tip of the paint brush may correspond to one or more second widths of markings displayed in the AR graphics user interface 504, and one or more third amounts of bending of the tip of the paint brush may correspond to one or more third widths of marking displayed in the AR graphics user interface 504. In this way, as the graphics input tool moves in conjunction with the AR graphics display surface, markings may be displayed in the AR graphics user interface 504 based on the state of the paint brush determined using the one or more graphics input tool state models 522.

In various examples, the one or more graphics input tool state models 522 may use information obtained from at least one of the object detection service 510, the object tracking service 512, or the depth determination service 514 to determine whether the graphics input tool is within a threshold distance of an AR graphics display surface. For example, the one or more graphics input tool state models 522 may be implemented to determine that a paint brush is within a threshold distance of a wall that comprises an AR graphics display surface. In one or more illustrative examples, the one or more graphics input tool state models 522 may be implemented to determine that the paint brush is touching the wall. In one or more examples, when the graphics input tool is within the threshold distance of the AR graphics display surface, marking functionality of the graphics input tool may be in an activated state. In response to the graphics input tool being in an active state, markings may be generated within the AR graphics user interface 504 based on motion of the graphics input tool. In scenarios where the graphics display tool is greater than the threshold distance from the AR graphics display surface, the graphics input tool may be in a deactivated state. In response to the graphics input tool being in the deactivated state, motion of the graphics input tool may not result in markings being generated in the AR graphics user interface 504. In one or more illustrative examples, the threshold distance may be no greater than 50 mm, no greater than 40 mm, no greater than 30 mm, no greater than 20 mm, no greater than 10 mm, no greater than 5 mm, or no greater than 1 mm.

Although the one or more graphics input tool tracking models 518, the one or more hand tracking models 520, and the one or more graphics input tool state models 522 are included in the AR graphics system 416 and shown separate from the client device 402 in the illustrative example of FIG. 5, in one or more implementations, at least a portion of the operations performed by the one or more graphics input tool tracking models 518, the one or more hand tracking models 520, the one or more graphics input tool state models 522, or one more combinations thereof, may be performed by the client device 402. In various examples, the architecture 500 is arranged with the use of the API 516 by the models 518, 520, 522 to access information from the AR graphics services 506 in order to minimize the computing resources and memory resources utilized by the client device 402 to generate the AR graphics user interface 504. That is, since the client device 402 may include a head-worn device or a wearable device having limited processing resources and memory resources, at least a portion of the operations performed with respect to the AR graphics display content item 502 to generate the AR graphics user interface 504 may be performed using computing resources and memory resources located remotely from the client device 402 using one or more calls of the API 516. In one or more illustrative examples, at least one of the one or more graphics input tool tracking models 518, the one or more hand tracking models 520, and the one or more graphics input tool state models 522 may be stored in memory of the client device 402 while the AR graphics services 506 are stored and executed using computing resources and memory resources located remotely with respect to the client device 402. In these scenarios, calls of the API 516 are used to obtain information from the AR graphics services 506 that is utilized by at least one of the one or more graphics input tool models 518, the one or more hand tracking models 520, or the one or more graphic input tool state models 522 to generate AR graphics within the AR graphics user interface 504. In one or more further examples, the surface detection system 422, the object detection system 426, the object tracking system 434, and the AR graphics display system 436 may include and/or implement components of the AR graphics services 506, the API 516, the graphics input tool tracking models 518, the one or more hand tracking models 520, and the one or more graphics input tool state models 522.

In one or more examples, the AR graphics system 416 may obtain user input 524. The user input 524 may be generated in response to actions taken by the user 404 with a graphics input tool. In various examples, one or more menus may be displayed in conjunction with the AR graphics user interface 504. In these scenarios, the user input 524 corresponds to selections from the one or more menus. The one or more menus may be displayed in the AR graphics user interface 504 as overlays of an AR graphics display surface. In one or more illustrative examples, the one or more menus may include a number of graphical user interface elements that are selectable to activate one or more functions of the AR graphics display content item 502. For example, one or more user interface elements of the one or more menus may be selectable to cause markings produced in the AR graphics user interface 504 to have a specified color. In addition, one or more user interface elements of the one or more menus may be selectable to generate markings having a specified width in the AR graphics user interface 504. In one or more further examples, one or more user interface elements of the one or more menus may be selectable to cause one or more additional AR content items to be executed with respect to one or more objects included in the AR graphics user interface 504.

In at least some examples, the function corresponding to a given user interface element may be activated in response to determining that a graphics input tool is within a threshold distance of the user interface element displayed in the AR graphics user interface 504 as an overlay of the AR graphics display surface. In one or more illustrative examples, an appearance of a user interface element may be modified in response to selection of the user interface element in response to user input 524. To illustrate, a user interface element that corresponds to generating markings having a given color may be displayed as having the given color and may become a brighter shade of the color in response to selection based on the user input 524. In one or more additional illustrative examples, a mesh collider may be generated for individual user interface elements and user input 524 indicated by contact between an input device, such as a finger, stylus, or graphics input tool, with the mesh collider may activate the function corresponding to the individual user interface element.

Figure 6:
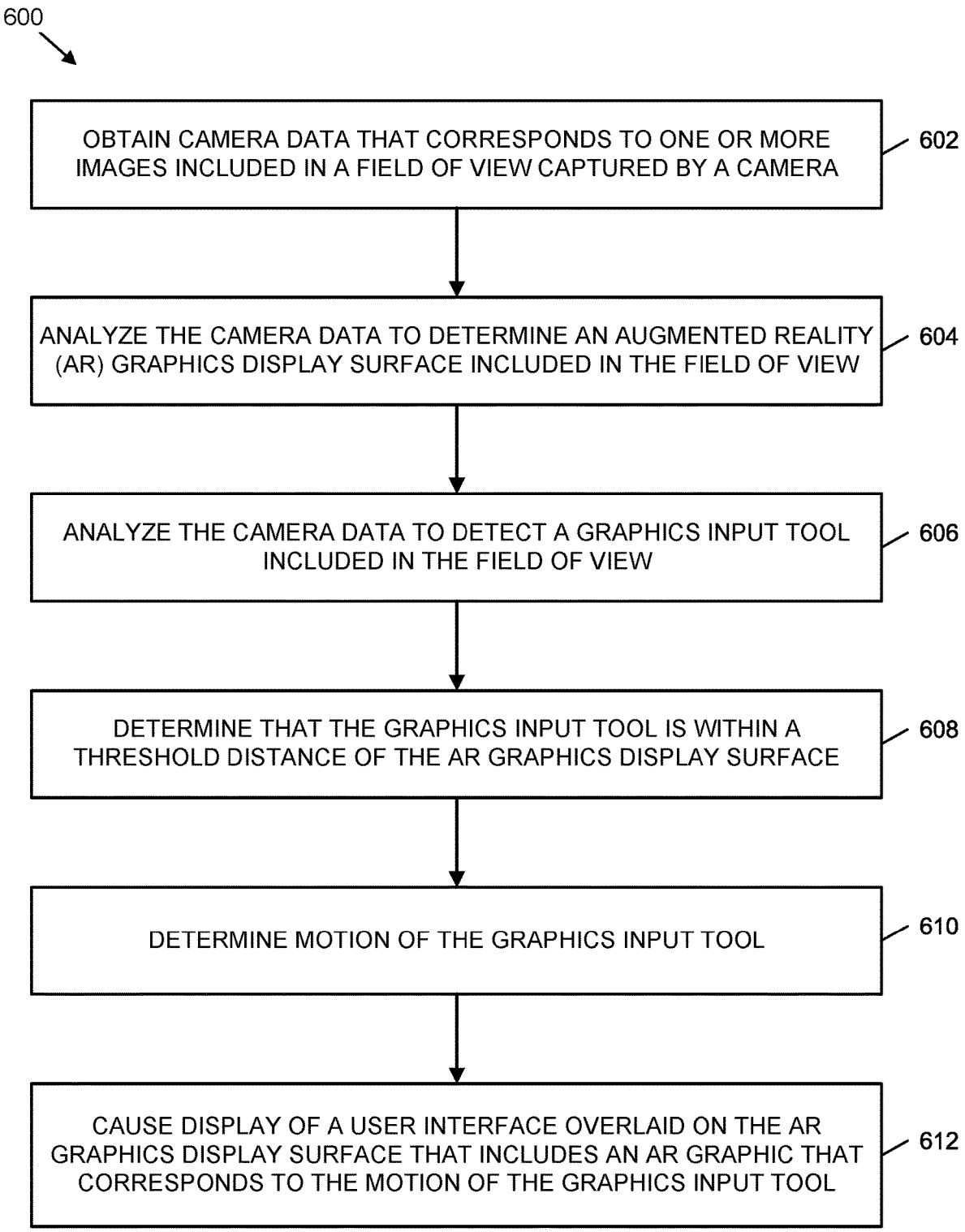
FIG. 6 is a flow diagram of a process to cause a user interface to be displayed with augmented reality graphics overlaid on a surface located in an environment, in accordance with one or more examples.
Figure 7:
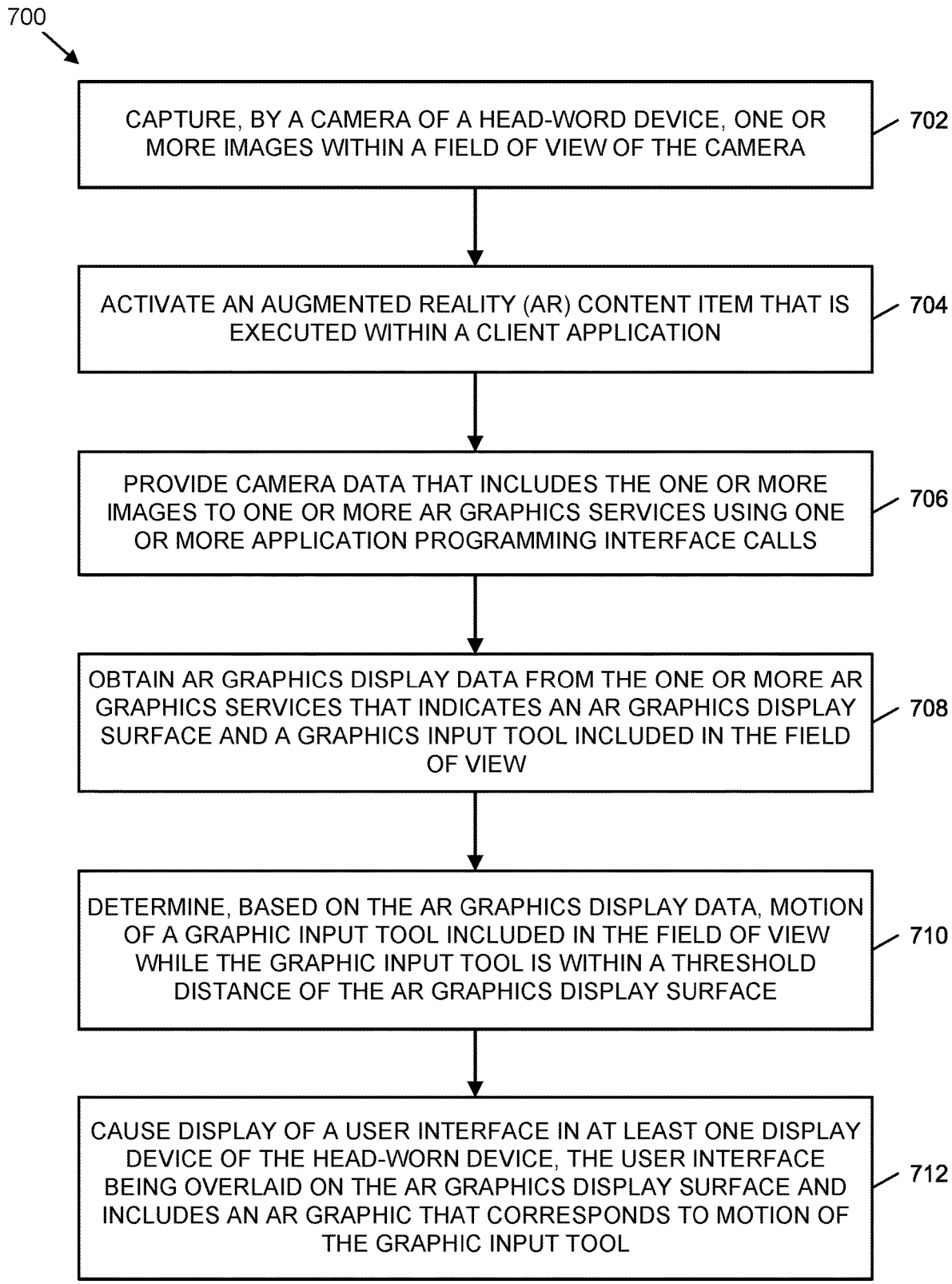
FIG. 7 is a flow diagram of a process to activate an augmented reality content item that uses data captured by a camera of a head-worn device to generate a user interface that includes augmented reality graphics overlaid on a surface located in an environment, in accordance with one or more examples.

FIGS. 6 and 7 illustrate flowcharts of processes to generate AR graphics as overlays of an AR graphics display surface located in a real-world scene. The processes may be embodied in computer-readable instructions for execution by one or more processors such that the operations of the processes may be performed in part or in whole by the functional components of at least one of one or more client devices or one or more server systems. Accordingly, the processes described below are by way of example with reference thereto, in some situations. However, in other implementations, at least some of the operations of the processes described with respect to FIGS. 6 and 7 may be deployed on various other hardware configurations. The processes described with respect to FIGS. 6 and 7 are therefore not intended to be limited to being performed by one or more server systems or one or more client device described herein and can be implemented in whole, or in part, by one or more additional components. Although the described flowcharts can show operations as a sequential process, many of the operations can be performed in parallel or concurrently. In addition, the order of the operations may be re-arranged. A process is terminated when its operations are completed. A process may correspond to a method, a procedure, an algorithm, etc. The operations of methods may be performed in whole or in part, may be performed in conjunction with some or all of the operations in other methods, and may be performed by any number of different systems, such as the systems described herein, or any portion thereof, such as a processor included in any of the systems.

FIG. 6 is a flow diagram of a process 600 to cause a user interface to be displayed with augmented reality graphics overlaid on a surface located in an environment, in accordance with one or more examples. The process 600 may include, at operation 602, obtaining camera data that corresponds to one or more images of a field of view captured by a camera. The camera may be located in a client device. The client device may include a head-worn device. In addition, the client device may include at least one of a wearable device or a mobile phone. The camera data may include a plurality of images of a real-world scene. In one or more examples, the camera data may include a number of video frames. In various examples, the camera data may include video frames captured from a plurality of cameras of a client device.

At operation 604, the process 600 may include analyzing the camera data to determine an augmented reality (AR) graphics display surface included in the field of view. In one or more examples, determining the AR graphics display surface may be performed in response to launching of an augmented reality content item that is executing within a client application. For example, the functionality of generating AR graphics as an overly of an AR graphics display surface may be performed, at least partly, based on computer-readable code of an augmented reality content item that executes within a client application.

A number of characteristics of objects of interest included in the camera data may be analyzed to identify the AR graphics display surface. For example, at least one of dimensions, color, texture, or shape of objects of interest may be analyzed to identify the AR graphics display surface. One or more object recognition computational techniques may be used to analyze the camera data to identify the AR graphics display surface in the real world scene. In one or more illustrative examples, one or more neural networks may be executed to identify the AR graphics display surface. In various examples, the one or more neural networks may be trained using previously captured images of objects that correspond to an AR graphics display surface. In one or more additional examples, the AR graphics display surface may be identified based at least in part on input obtained from a user of the client device indicating the AR graphics display surface in the field of view.

The AR graphics display surface may be a two-dimensional surface in a real-world scene having at least a minimum length and at least a minimum width. In one or more examples, the AR graphics display surface may include a wall, a floor, a table, a projection screen, a piece of furniture, a canvas, a sketch pad, one or more pieces of paper, a posterboard, one or more combinations thereof, and the like. In various examples, the AR graphics display surface may be affixed to a wall or other structure. In one or more illustrative examples, the AR graphics display surface may have at least one of a length or width of at least 8 cm, at least 12 cm, at least 15 cm, at least 18 cm, at least 20 cm, at least 30 cm, at least 50 cm, or at least 100 cm. In situations where a surface, such as a wall or floor comprises the entire field of view of the camera, at least a portion of the surface included in the field of view is identified as the AR graphics display surface.

In addition, at operation 606, the process 600 may include analyzing the camera data to detect a graphics input tool included in the field of view. The graphics input tool may include a handheld implement that may be manipulated by a user in a manner that corresponds to motion produced in the making of markings on a surface, such as handwriting, painting, drawing, one or more combinations thereof, and the like. In one or more additional examples, the graphics input tool may include a finger of a user.

The process 600 may also include, at operation 608, determining that the graphics input tool is within a threshold distance of the AR graphics display surface. In one or more examples, determining that the graphics display tool is within the threshold distance of the AR graphics display surface may include determining, based on the camera data, that the graphics input tool is touching the AR graphics display surface. In various examples, determining that the graphics input tool is within the threshold distance of the AR graphics display surface may include determining depth information indicating a distance of the graphics input tool from the AR graphics display surface.

Further, at operation 610, the process 600 may include determining, based on the camera data, motion of the graphics input tool while the graphics input tool is within the threshold distance of the AR graphics display surface. The motion of the graphics input tool may be determined based on changes in the location of the graphics input tool in a number of video frames.

In one or more additional examples, the camera data may be analyzed to detect a hand grasping the graphics input tool included in the field of view. In various examples, a first position of the hand with respect to a second position of the graphics input tool may be determined. For example, an angle of the graphics input tool may be determined based on the first position of the hand with respect to the second position of the graphics input tool. In one or more scenarios, motion of the hand while the graphics input tool is within the threshold distance of the AR graphics display surface may be determined based on the camera data. Characteristics of the AR graphic may be based on the motion of the graphics input tool, the motion of the hand, and the first position of the hand with respect to the second position of the graphics input tool. To illustrate, motion of the graphics input tool, motion of the hand, and an angle of the graphics input tool may be used to determine a width of markings generated in response to motion of the graphics input tool.

In one or more examples, an application programming interface (API) may be provided that enables information to be obtained from one or more services to detect objects in a real-world scene and to track the motion of the objects in the real-world scene. For example, the analysis of the camera data to detect the graphics input tool in the real-world scene may be performed in response to one or more first API calls to an object detection service. In addition, determining a distance between the graphics input tool and the AR graphics display surface and/or determining whether the graphics input tool is within a threshold distance of the AR graphics display surface may be performed in response to one or more second API calls to a depth determination service. Further, determining the motion of the graphics input tool may be performed in response to one or more third API calls to an object tracking service.

At operation 612, the process 600 may also include causing display of a user interface overlaid on the AR graphics display surface. The user interface may include an AR graphic that corresponds to the motion of the graphics input tool. In one or more examples, one or more machine learning models may be implemented to determine an amount of bending of a tip of the graphics input tool. A size of a marking may then be determined based on the amount of bending of the tip of the graphics input tool. In various examples, the one or more machine learning models may be trained using a supervised machine learning training technique based on a training data set. The training data set may include a first number of images of graphics input tools that correspond to a first amount of bending of the tips of the graphics input tools that are associated with a first label and a second number of images of graphics input tools that correspond to a second amount of bending of the tips of the graphics input tools that are associated with a second label.

In various examples, an AR graphics menu may be displayed within the user interface. The AR graphics menu may include a number of user interface elements. Individual user interface elements may be selectable to activate one or more features of an augmented reality content item to at least one of create or modify at least a portion of the AR graphic. For example, the AR graphics menu may include user interface elements that are selectable to create markings of the AR graphic having a specified color. In one or more examples, a features that corresponds to a respective user interface element may be activated in response to determining that an object included in the field of view is within an additional threshold distance of a user interface element of the number of user interface elements of the AR graphics menu. The additional threshold distance used to determine when to activate a feature of a user interface element may be the same as or different from the threshold distance between the graphics input tool and the AR graphics display surface that triggers the generating of markings used to create the AR graphics.

In one or more examples, at least one of the user interface or the AR graphic may be modified. For example, additional AR graphics may be added to the user interface. In addition, an existing AR graphic may be modified by adding additional markings to the AR graphic. Further, at least one of the user interface or the AR graphic may be modified by executing an additional augmented reality content item with respect to at least one of the AR graphic or the AR graphics display surface. The additional augmented reality content item may be executable to cause one or more additional AR graphics to be displayed in the user interfaces. For example, the additional augmented reality content item may cause the display of at least one of images of items, text content, animations, or additional computer-generated graphics, such as emojis, stickers, or avatars, in the user interface. The additional augmented reality content item may also be executable to modify an appearance of the AR graphic, such as modifying at least one of a shape, color, or size of the AR graphic. In one or more illustrative examples, user input to select the additional augmented reality content item from the AR graphics menu may cause the user interface to be modified in accordance with the additional augmented reality content item.

In at least some examples, the AR graphic may be saved in association with the AR graphics display surface. Thus, as a client device including the camera moves away from the AR graphics display surface, the user interface may be modified to no longer show the AR graphic. Additionally, when the client device including the camera moves such that the AR graphics display surface is within the field of view of the camera, the AR graphic may reappear in the user interface. For example, the field of view of the camera may change from a first field of view that includes the AR graphics display surface to a second field of view in which the AR graphics display surface is absent. In these scenarios, the user interface is modified by removing the AR graphic from the user interface. In various examples, when the field of view of the camera has changed from the second field of view back to the first field of view, the user interface may be modified by adding the AR graphic to the user interface.

Further, additional camera data may be obtained that corresponds to one or more additional images of the second field of view captured by the camera. The additional camera data may include one or more additional images captured during a period of time subsequent to an initial period of time in which the one or more images of the initial camera data were captured. In these instances, the additional camera data is analyzed to determine an additional AR graphics display surface included in the second field of view. In addition, the additional camera data may be analyzed to detect the graphics input tool in the second field of view and to determine that the graphics input tool is within a threshold distance of the additional AR graphics display surface. Additional motion of the graphics input tool may also be determined based on the additional camera data while the graphics input tool is within the threshold distance of the additional AR graphics display surface. As a result, an additional user interface may be displayed that is overlaid on the additional AR graphics display surface, where the additional user interface includes an additional AR graphic that corresponds to the additional motion of the graphics input tool. In various examples, the additional AR graphic may be stored in conjunction with the additional AR graphics display surface.

In one or more additional examples, distance information may be used to adjust the appearance of an AR graphic displayed in the user interface. For example, coordinates in real world space for the AR graphics display surface may be determined and the coordinates in real world space may be used to determine a distance from the camera to the AR graphics display surface. Location data for the camera, such as location coordinates of a client device housing the camera, may also be used to determine a distance between the camera to the AR graphics display surface. In one or more illustrative examples, the distance from the camera to the AR graphics display surface may change from a first distance to a second distance. In these scenarios, a level of magnification of the AR graphic within the user interface is modified based on the distance from the camera to the AR graphics display changing from the first distance to the second distance. To illustrate, as the camera moves farther from the AR graphics display surface, magnification of the AR graphic may increase. Additionally, in situations where the camera moves closer to the AR graphics display surface, the magnification of the AR graphic decreases. In this way, the appearance of the AR graphic may be relatively consistent as the distance between the camera and the AR graphics display surface changes.

In one or more further examples, information may be obtained from one or more sensors of the client device to determine a location of the camera with respect to the AR graphics display surface. For example, gyro sensor information may be used to generate location information of the camera in relation to the AR graphics display surface. In various examples, the gyro sensor data may be used to calibrate the location of the camera with respect the coordinates in world space of the AR graphics display surface. In one or more illustrative examples, the origin of the world space coordinate system may be identified as a point of the AR graphics display system and the gyro sensor data may be calibrated with respect to the origin. As gyro sensor data indicates changes to at least one of the location or orientation of the camera, the positional data derived from the modified gyro sensor data may be used to generate changes in coordinates in world space of the camera. In this way, at least one of the AR graphics display surface or AR graphics generated with respect to the AR graphics display surface may appear to be fixed in real world space as at least one of the position or orientation of the camera and/or client device changes.

FIG. 7 is a flow diagram of a process 700 to activate an augmented reality content item that uses data captured by a camera of a head-worn device to generate a user interface that includes augmented reality graphics overlaid on a surface located in an environment, in accordance with one or more examples. At operation 702, the process 700 may include capturing, by a camera of a head-worn device, one or more images within a field of view of the camera. The head-worn device may include at least one display device that displays user interfaces viewable by a user of the head-worn device.

The process 700 may include, at operation 704, activating an augmented reality (AR) content item that is executed within a client application. For example, a user may select an icon of an augmented reality content item from a menu of augmented reality content items to activate the AR content item. In one or more illustrative examples, the AR content item may include the AR graphics display content item 502 of FIG. 5.

In addition, at operation 706, the process 700 may include in response to activating the augmented reality content item, providing camera data that includes the one or more images to one or more AR graphics services using one or more application programming interface (API) calls. The camera data may correspond to the one or more images captured by the camera of the head-worn device. In various examples, the camera data may be analyzed by the one or more AR graphics services to generate AR graphics within a user interface displayed by the head-worn device.

The process 700 may also include, at operation 708, obtaining AR graphics display data from the one or more AR graphics services. The AR graphics display data may indicate at least one of an AR graphics display surface or a graphics input tool included in the field of view. In one or more examples, the camera data may be analyzed by an object detection service that is a component of at least one of a surface detection system or an object detection system to determine an object of interest included in the field of view that corresponds to an AR graphics display surface. In various examples, characteristics of one or more objects of interest included in the field of view may be analyzed to determine the AR graphics display surface. In various examples, the AR graphics display data may indicate at least one of a location, dimensions, or a shape of the AR graphics display surface. Additionally, the AR graphics display data may indicate at least one of a location, a size, a shape, or dimensions of the graphics input tool.

Additionally, the process 700 may include, at operation 710, determining, based on the AR graphics display data, motion of a graphics input tool included in the field of view while the graphic input tool is within a threshold distance of the AR graphics display surface. The graphics input tool may be identified by the object detection service analyzing the camera data to determine an object of interest having characteristics that correspond to characteristics of graphics input tools. The motion of the graphics input tool may be determined by an object tracking service analyzing the camera data and providing information to one or more graphics input tool tracking models. At least one of the object tracking service or the graphics input tool tracking models may be a component of an object tracking system. The motion of the graphics input tool may be identified by determining differences in location of the graphics input tool in a number of frames of video captured by the camera.

Determining that the graphics input tool is within the threshold distance of the AR graphics display surface may include determining a distance between the graphics input tool and the AR graphics display surface. In one or more examples, at least one of a depth determination service that may be a component of an AR graphics display system or the object tracking service 512 may provide information to one or more graphics input tool state models to determine that marking features of the augmented reality content item are activated and that the graphics display tool is within the threshold distance of the AR graphics display surface. In various examples, a determination may be made that the graphics input tool is outside of the threshold distance of the AR graphics display surface. In these instance, marking functionality features of the augmented reality content item are deactivated such that markings are no longer produced based on motion of the graphics input tool.

At operation 712, the process 700 may also include causing display of a user interface overlaid on the AR graphics display surface. The user interface may include an AR graphic that corresponds to the motion of the graphic input tool. The user interface may also include a menu that includes a number of user interface elements that may be selectable to produce markings of AR graphics that have respective colors or widths.

Figure 8:
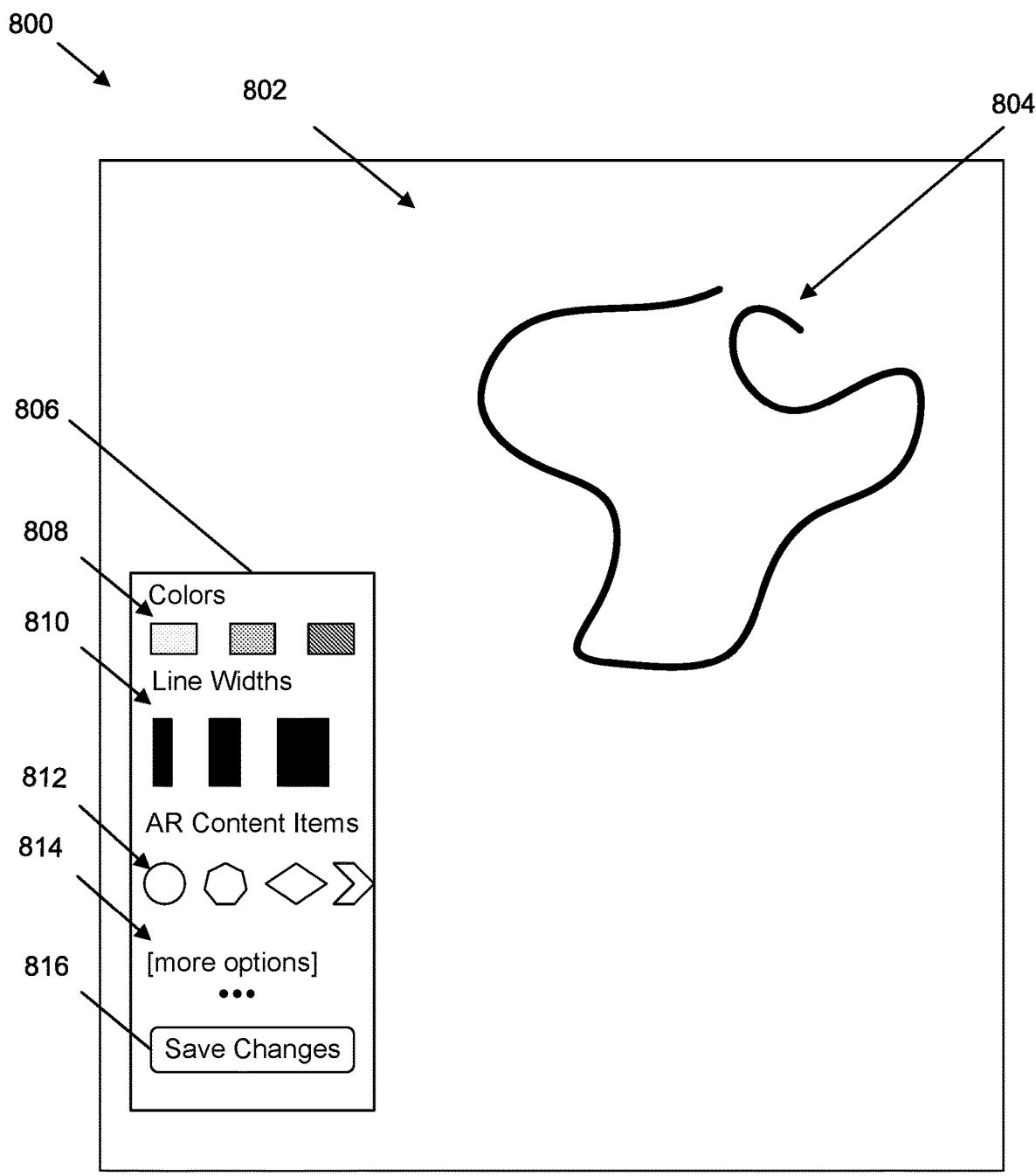
FIG. 8 is a user interface that includes augmented reality graphics overlaid on a surface, in accordance with one or more examples.

FIG. 8 is a user interface 800 that includes augmented reality graphics overlaid on a surface, in accordance with one or more examples. The user interface 800 may include an AR graphics display surface 802. The AR graphics display surface 802 may include a portion of a wall, table, floor, or another surface that is suitable as a background for the display of AR graphics. In one or more examples, the AR graphics display surface 802 may have a size that is greater than a field of view of a camera capturing images of the AR graphics display surface 802. In these examples, the user interface 800 may display a portion of the AR graphics display surface 802.

The user interface 800 may also display an AR graphic 804. The AR graphic 804 may be displayed as an overlay of the AR graphics display surface 802. The AR graphic 804 may be displayed in response to a path of motion of a graphics input tool across the AR graphics display surface 802. In one or more examples, the AR graphic 804 may be part of a painting, text content, a drawing, one or more combinations thereof, and the like.

The user interface 800 may also include a menu 806. The menu 806 may be displayed as an overlay of the AR graphics display surface 802. The menu 806 may include a number of user interface elements that are selectable to at least one of create or modify the AR graphic 804. For example, the menu 806 may include first user interface elements 808 that are selectable to cause markings of an AR graphic to be generated having a respective color that corresponds to the selected first user interface element 808. Additionally, the menu 806 may include second user interface elements 810 that are selectable to cause marking of an AR graphic to be generated having line widths that correspond to the respective second user interface elements 810. The menu 806 may also include third user interface elements 812 that may be selectable to execute augmented reality content items that correspond to the respective third user interface elements 812. In one or more illustrative examples, the individual third user interface elements 812 may correspond to a respective sticker that may be displayed in conjunction with the AR graphic 804.

Further, the menu 806 may include a fourth user interface element 814 that is selectable to cause additional selectable options to be displayed. The additional selectable options may correspond to additional augmented reality content items, additional colors, additional line widths, additional characteristics of AR graphics, one or more combinations thereof, and so forth. The additional options displayed in response to selection of the fourth user interface element 814 may also include a red-green-blue (RGB) color picker. The RGB color picker may include a user interface element that enables the selection of a number of different colors to be used to generate markings of the AR graphic 804. In at least some examples, the RGB color picker may enable the selection of colors using red, green, and blue coordinates entered into a user interface element. In one or more additional examples, the RGB color picker may include visual representations of a number of colors at one or more levels of granularity that are selectable using the graphics input tool.

In addition, the menu 806 may include a fifth user interface element 816 that is selectable to save the AR graphic 804. In one or more examples, the AR graphic 804 may be saved in association with the AR graphics display surface 802, such that the AR graphic 804 is displayed in response to the AR graphics display surface 802 being in a field of view of a client device that is displaying the user interface 800.

In one or more examples, the third user interface elements 812 may include user interface elements that are selectable to add augmented reality content items to the AR graphic, such as one or more emojis, one or more pictures, or one or more shapes. In various examples, the one or more shapes may include a number of shapes having given boundaries. The boundaries of a given shape may be adjusted. Additionally, a color of the shape may also be selected by the user. In one or more illustrative examples, a third user interface element 812 may be selected by a user in response to determining that the position of the graphics input tool corresponds to the location of the third user interface element 812. In response to detecting the selection of the third user interface element 812, a visual representation of the item associated with the third user interface element is displayed in conjunction with the location of the graphics input tool. As the graphics input tool moves in relation to the AR graphics display surface 802, the location of the visual representation of the item associated with the selected third user interface element 812 may also move in a corresponding manner. A location of the selected third user interface element 812 may be determined in response to detecting that a touch and hold operation has taken place with respect to the graphics input tool and a point on the AR graphics display surface 802. The touch and hold operation may be detected in response to determining that the location of the graphics input tool has been relatively the same for at least 0.5 seconds, at least 1 second, at least 1.5 seconds, or at least 2 seconds. In response to determining that a location of the selected third user interface element 812, the selected third user interface element 812 may be displayed in the location after the graphics input tool has moved to another location. In one or more additional illustrative examples, an augmented reality item may be selected in response to a touch and hold input detected with a specified third user interface element 812 to select that augmented reality content item followed by a dragging input with respect to the selected third user interface element 812 to a location on the AR graphics display surface 804. The dragging operation may be performed by a user holding the graphics input tool to touch the AR graphics display surface 802 for a period of time and then removing the graphics input tool from the AR graphics display surface 802 at the location on the AR graphics display surface where the selected augmented reality content item is to be placed.

Figure 9:
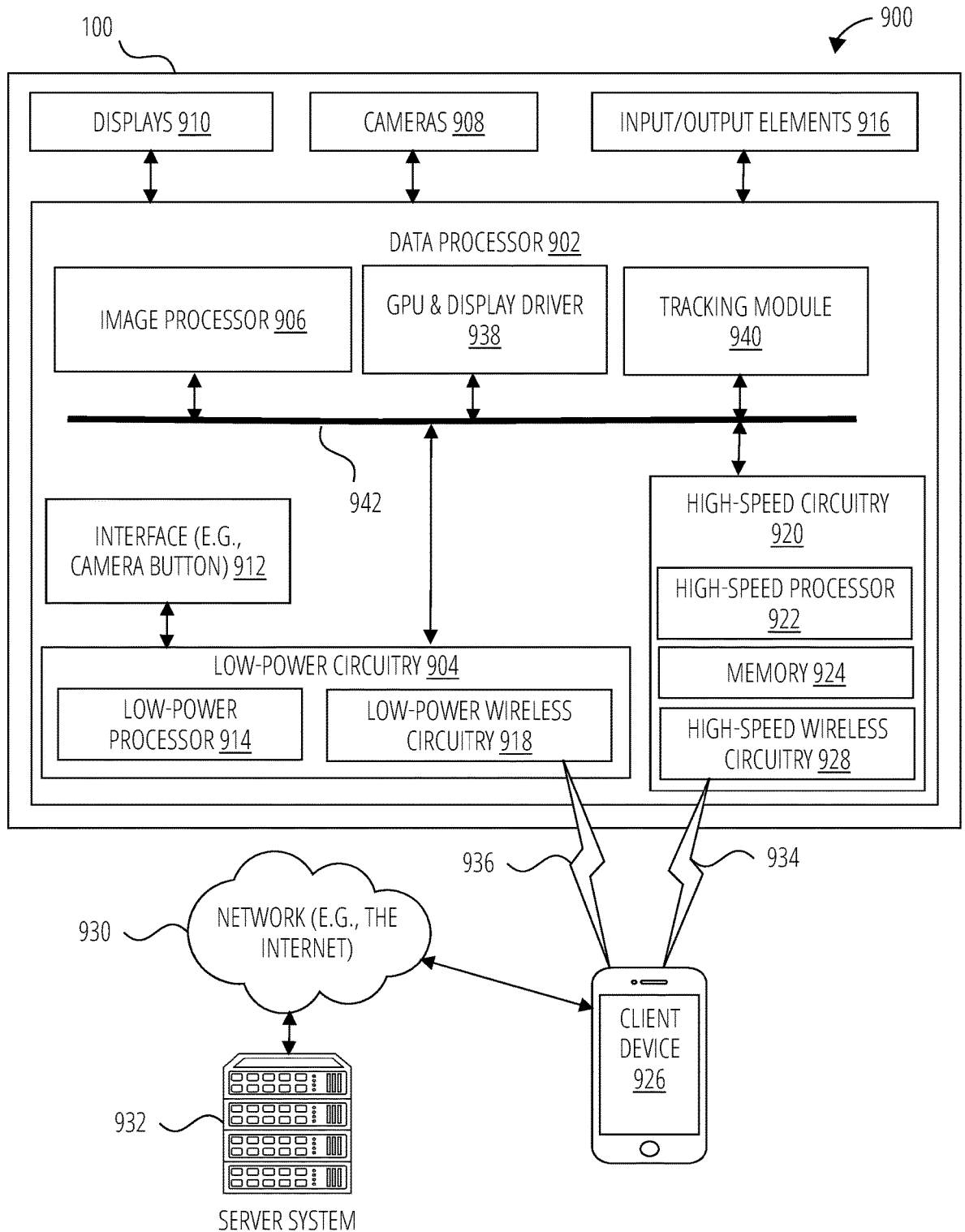
FIG. 9 is a block diagram showing a software architecture within which the present disclosure may be implemented, in accordance with some examples.

FIG. 9 is a block diagram illustrating a networked system 900 including details of the glasses 100, in accordance with some examples. The networked system 900 includes the glasses 100, a client device 926, and a server system 932. The client device 926 may be a smartphone, tablet, phablet, laptop computer, access point, or any other such device capable of connecting with the glasses 100 using a low-power wireless connection 936 and/or a high-speed wireless connection 934. The client device 926 is connected to the server system 932 via the network 930. The network 930 may include any combination of wired and wireless connections. The server system 932 may be one or more computing devices as part of a service or network computing system. The client device 926 and any elements of the server system 932 and network 930 may be implemented using details of the software architecture 1104 or the machine 300 described in FIG. 11 and FIG. 3 respectively.

The glasses 100 include a data processor 902, displays 910, one or more cameras 908, and additional input/output elements 916. The input/output elements 916 may include microphones, audio speakers, biometric sensors, additional sensors, or additional display elements integrated with the data processor 902. Examples of the input/output elements 916 are discussed further with respect to FIG. 11 and FIG. 3. For example, the input/output elements 916 may include any of I/O components 306 including output components 328, motion components 336, and so forth. Examples of the displays 910 are described in FIG. 2. In the particular examples described herein, the displays 910 include a display for the user's left and right eyes.

The data processor 902 includes an image processor 906 (e.g., a video processor), a GPU & display driver 938, a tracking module 940, an interface 912, low-power circuitry 904, and high-speed circuitry 920. The components of the data processor 902 are interconnected by a bus 942.

The interface 912 refers to any source of a user command that is provided to the data processor 902. In one or more examples, the interface 912 is a physical button that, when depressed, sends a user input signal from the interface 912 to a low-power processor 914. A depression of such button followed by an immediate release may be processed by the low-power processor 914 as a request to capture a single image, or vice versa. A depression of such a button for a first period of time may be processed by the low-power processor 914 as a request to capture video data while the button is depressed, and to cease video capture when the button is released, with the video captured while the button was depressed stored as a single video file. Alternatively, depression of a button for an extended period of time may capture a still image. In some examples, the interface 912 may be any mechanical switch or physical interface capable of accepting user inputs associated with a request for data from the cameras 908. In other examples, the interface 912 may have a software component, or may be associated with a command received wirelessly from another source, such as from the client device 926.

The image processor 906 includes circuitry to receive signals from the cameras 908 and process those signals from the cameras 908 into a format suitable for storage in the memory 924 or for transmission to the client device 926. In one or more examples, the image processor 906 (e.g., video processor) comprises a microprocessor integrated circuit (IC) customized for processing sensor data from the cameras 908, along with volatile memory used by the microprocessor in operation.

The low-power circuitry 904 includes the low-power processor 914 and the low-power wireless circuitry 918. These elements of the low-power circuitry 904 may be implemented as separate elements or may be implemented on a single IC as part of a system on a single chip. The low-power processor 914 includes logic for managing the other elements of the glasses 100. As described above, for example, the low-power processor 914 may accept user input signals from the interface 912. The low-power processor 914 may also be configured to receive input signals or instruction communications from the client device 926 via the low-power wireless connection 936. The low-power wireless circuitry 918 includes circuit elements for implementing a low-power wireless communication system. Bluetooth™ Smart, also known as Bluetooth™ low energy, is one standard implementation of a low power wireless communication system that may be used to implement the low-power wireless circuitry 918. In other examples, other low power communication systems may be used.

The high-speed circuitry 920 includes a high-speed processor 922, a memory 924, and a high-speed wireless circuitry 928. The high-speed processor 922 may be any processor capable of managing high-speed communications and operation of any general computing system used for the data processor 902. The high-speed processor 922 includes processing resources used for managing high-speed data transfers on the high-speed wireless connection 934 using the high-speed wireless circuitry 928. In some examples, the high-speed processor 922 executes an operating system such as a LINUX operating system or other such operating system such as the operating system 1112 of FIG. 11. In addition to any other responsibilities, the high-speed processor 922 executing a software architecture for the data processor 902 is used to manage data transfers with the high-speed wireless circuitry 928. In some examples, the high-speed wireless circuitry 928 is configured to implement Institute of Electrical and Electronic Engineers (IEEE) 802.11 communication standards, also referred to herein as Wi-Fi. In other examples, other high-speed communications standards may be implemented by the high-speed wireless circuitry 928.

The memory 924 includes any storage device capable of storing camera data generated by the cameras 908 and the image processor 906. While the memory 924 is shown as integrated with the high-speed circuitry 920, in other examples, the memory 924 may be an independent stand-alone element of the data processor 902. In some such examples, electrical routing lines may provide a connection through a chip that includes the high-speed processor 922 from image processor 906 or the low-power processor 914 to the memory 924. In other examples, the high-speed processor 922 may manage addressing of the memory 924 such that the low-power processor 914 will boot the high-speed processor 922 any time that a read or write operation involving the memory 924 is desired.

The tracking module 940 estimates a pose of the glasses 100. For example, the tracking module 940 uses image data and associated inertial data from the cameras 908 and the position components 340, as well as GPS data, to track a location and determine a pose of the glasses 100 relative to a frame of reference (e.g., real-world scene environment). The tracking module 940 continually gathers and uses updated sensor data describing movements of the glasses 100 to determine updated three-dimensional poses of the glasses 100 that indicate changes in the relative position and orientation relative to physical objects in the real-world scene environment. The tracking module 940 permits visual placement of virtual objects relative to physical objects by the glasses 100 within the field of view of the user via the displays 910.

The GPU & display driver 938 may use the pose of the glasses 100 to generate frames of virtual content or other content to be presented on the displays 910 when the glasses 100 are functioning in a traditional augmented reality mode. In this mode, the GPU & display driver 938 generates updated frames of virtual content based on updated three-dimensional poses of the glasses 100, which reflect changes in the position and orientation of the user in relation to physical objects in the user's real-world scene environment.

One or more functions or operations described herein may also be performed in an application resident on the glasses 100 or on the client device 926, or on a remote server. For example, one or more functions or operations described herein may be performed by one of the applications 1106 such as messaging Application 1146.

Figure 10:
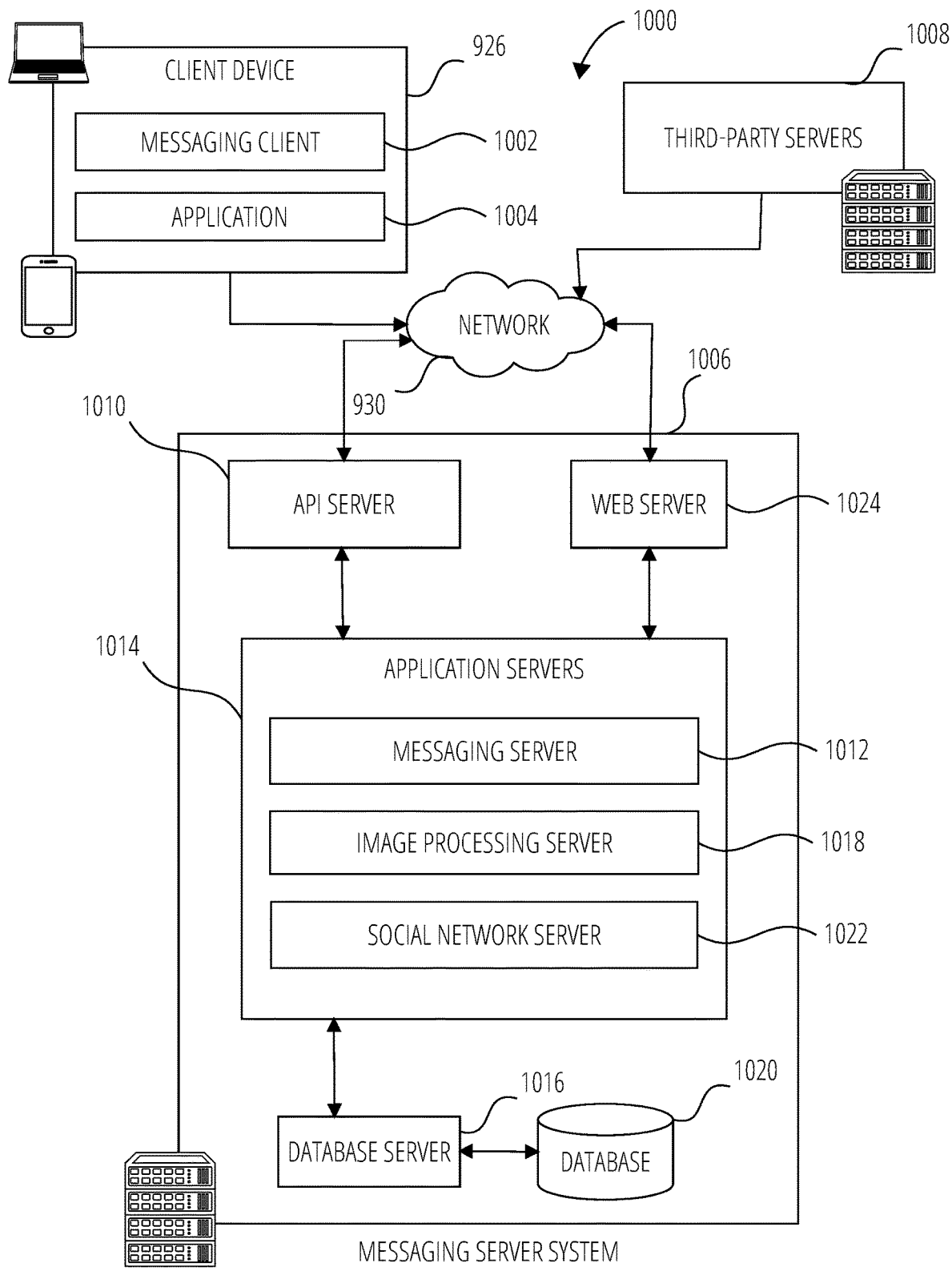
FIG. 10 is a block diagram illustrating details of the head-worn device of FIG. 1, in accordance with some examples.

FIG. 10 is a block diagram showing an example messaging system 1000 for exchanging data (e.g., messages and associated content) over a network. The messaging system 1000 includes multiple instances of a client device 926 which host a number of applications, including a messaging client 1002 and other Applications 1004. A messaging client 1002 is communicatively coupled to other instances of the messaging client 1002 (e.g., hosted on respective other client devices 926), a messaging server system 1006 and third-party servers 1008 via a network 930 (e.g., the Internet). A messaging client 1002 can also communicate with locally-hosted Applications 1004 using Application Program Interfaces (APIs).

A messaging client 1002 is able to communicate and exchange data with other messaging clients 1002 and with the messaging server system 1006 via the network 930. The data exchanged between messaging clients 1002, and between a messaging client 1002 and the messaging server system 1006, includes functions (e.g., commands to invoke functions) as well as payload data (e.g., text, audio, video or other multimedia data).

The messaging server system 1006 provides server-side functionality via the network 930 to a particular messaging client 1002. While some functions of the messaging system 1000 are described herein as being performed by either a messaging client 1002 or by the messaging server system 1006, the location of some functionality either within the messaging client 1002 or the messaging server system 1006 may be a design choice. For example, it may be technically preferable to initially deploy some technology and functionality within the messaging server system 1006 but to later migrate this technology and functionality to the messaging client 1002 where a client device 926 has sufficient processing capacity.

The messaging server system 1006 supports various services and operations that are provided to the messaging client 1002. Such operations include transmitting data to, receiving data from, and processing data generated by the messaging client 1002. This data may include message content, client device information, geolocation information, media augmentation and overlays, message content persistence conditions, social network information, and live event information, as examples. Data exchanges within the messaging system 1000 are invoked and controlled through functions available via user interfaces (UIs) of the messaging client 1002.

Turning now specifically to the messaging server system 1006, an Application Program Interface (API) server 1010 is coupled to, and provides a programmatic interface to, application servers 1014. The application servers 1014 are communicatively coupled to a database server 1016, which facilitates access to a database 1020 that stores data associated with messages processed by the application servers 1014. Similarly, a web server 1024 is coupled to the application servers 1014, and provides web-based interfaces to the application servers 1014. To this end, the web server 1024 processes incoming network requests over the Hypertext Transfer Protocol (HTTP) and several other related protocols.

The Application Program Interface (API) server 1010 receives and transmits message data (e.g., commands and message payloads) between the client device 926 and the application servers 1014. Specifically, the Application Program Interface (API) server 1010 provides a set of interfaces (e.g., routines and protocols) that can be called or queried by the messaging client 1002 in order to invoke functionality of the application servers 1014. The Application Program Interface (API) server 1010 exposes various functions supported by the application servers 1014, including account registration, login functionality, the sending of messages, via the application servers 1014, from a particular messaging client 1002 to another messaging client 1002, the sending of media files (e.g., images or video) from a messaging client 1002 to a messaging server 1012, and for possible access by another messaging client 1002, the settings of a collection of media data (e.g., story), the retrieval of a list of friends of a user of a client device 926, the retrieval of such collections, the retrieval of messages and content, the addition and deletion of entities (e.g., friends) to an entity graph (e.g., a social graph), the location of friends within a social graph, and opening an application event (e.g., relating to the messaging client 1002).

The application servers 1014 host a number of server applications and subsystems, including for example a messaging server 1012, an image processing server 1018, and a social network server 1022. The messaging server 1012 implements a number of message processing technologies and functions, particularly related to the aggregation and other processing of content (e.g., textual and multimedia content) included in messages received from multiple instances of the messaging client 1002. As will be described in further detail, the text and media content from multiple sources may be aggregated into collections of content (e.g., called stories or galleries). These collections are then made available to the messaging client 1002. Other processor and memory intensive processing of data may also be performed server-side by the messaging server 1012, in view of the hardware requirements for such processing.

The application servers 1014 also include an image processing server 1018 that is dedicated to performing various image processing operations, typically with respect to images or video within the payload of a message sent from or received at the messaging server 1012.

The social network server 1022 supports various social networking functions and services and makes these functions and services available to the messaging server 1012. To this end, the social network server 1022 maintains and accesses an entity graph within the database 1020. Examples of functions and services supported by the social network server 1022 include the identification of other users of the messaging system 1000 with which a particular user has relationships or is "following," and also the identification of other entities and interests of a particular user.

The messaging client 1002 can notify a user of the client device 926, or other users related to such a user (e.g., "friends"), of activity taking place in shared or shareable sessions. For example, the messaging client 1002 can provide participants in a conversation (e.g., a chat session) in the messaging client 1002 with notifications relating to the current or recent use of a game by one or more members of a group of users. One or more users can be invited to join in an active session or to launch a new session. In some examples, shared sessions can provide a shared augmented reality experience in which multiple people can collaborate or participate.

Figure 11:
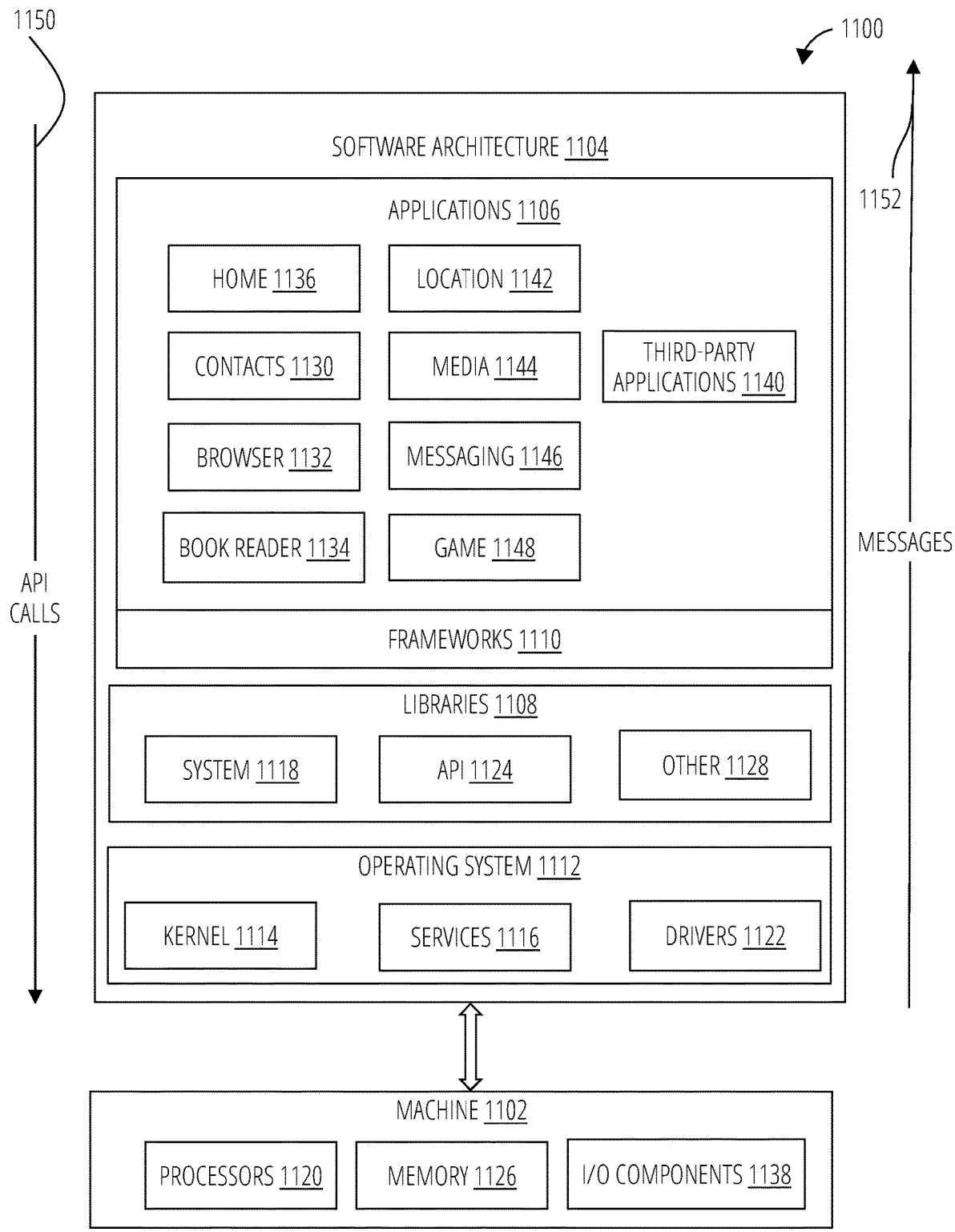
FIG. 11 is a diagrammatic representation of a networked environment in which the present disclosure may be deployed, in accordance with some examples.

FIG. 11 is a block diagram 1100 illustrating a software architecture 1104, which can be installed on any one or more of the devices described herein. The software architecture 1104 is supported by hardware such as a machine 1102 that includes processors 1120, memory 1126, and I/O components 1138. In this example, the software architecture 1104 can be conceptualized as a stack of layers, where individual layers provide a particular functionality. The software architecture 1104 includes layers such as an operating system 1112, libraries 1108, frameworks 1110, and applications 1106. Operationally, the applications 1106 invoke API calls 1150 through the software stack and receive messages 1152 in response to the API calls 1150.

The operating system 1112 manages hardware resources and provides common services. The operating system 1112 includes, for example, a kernel 1114, services 1116, and drivers 1122. The kernel 1114 acts as an abstraction layer between the hardware and the other software layers. For example, the kernel 1114 provides memory management, processor management (e.g., scheduling), component management, networking, and security settings, among other functionalities. The services 1116 can provide other common services for the other software layers. The drivers 1122 are responsible for controlling or interfacing with the underlying hardware. For instance, the drivers 1122 can include display drivers, camera drivers, BLUETOOTH® or BLUETOOTH® Low Energy drivers, flash memory drivers, serial communication drivers (e.g., Universal Serial Bus (USB) drivers), WI-FI® drivers, audio drivers, power management drivers, and so forth.

The libraries 1108 provide a low-level common infrastructure used by the applications 1106. The libraries 1108 can include system libraries 1118 (e.g., C standard library) that provide functions such as memory allocation functions, string manipulation functions, mathematic functions, and the like. In addition, the libraries 1108 can include API libraries 1124 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) graphic content on a display, GLMotif used to implement user interfaces), image feature extraction libraries (e.g. OpenIMAJ), database libraries (e.g., SQLite to provide various relational database functions), web libraries (e.g., WebKit to provide web browsing functionality), and the like. The libraries 1108 can also include a wide variety of other libraries 1128 to provide many other APIs to the applications 1106.

The frameworks 1110 provide a high-level common infrastructure that is used by the applications 1106. For example, the frameworks 1110 provide various graphical user interface (GUI) functions, high-level resource management, and high-level location services. The frameworks 1110 can provide a broad spectrum of other APIs that can be used by the applications 1106, some of which may be specific to a particular operating system or platform.

In an example, the applications 1106 may include a home Application 1136, a contacts Application 1130, a browser Application 1132, a book reader Application 1134, a location Application 1142, a media Application 1144, a messaging Application 1146, a game Application 1148, and a broad assortment of other applications such as third-party applications 1140. The applications 1106 are programs that execute functions defined in the programs. Various programming languages can be employed to create one or more of the applications 1106, structured in a variety of manners, such as object-oriented programming languages (e.g., Objective-C, Java, or C++) or procedural programming languages (e.g., C or assembly language). In a specific example, the third-party applications 1140 (e.g., applications developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party applications 1140 can invoke the API calls 1150 provided by the operating system 1112 to facilitate functionality described herein.

A "carrier signal" refers to any intangible medium that is capable of storing, encoding, or carrying instructions for execution by the machine, and includes digital or analog communications signals or other intangible media to facilitate communication of such instructions. Instructions may be transmitted or received over a network using a transmission medium via a network interface device.

A "client device" refers to any machine that interfaces to a communications network to obtain resources from one or more server systems or other client devices. A client device may be, but is not limited to, a mobile phone, desktop computer, laptop, portable digital assistants (PDAs), smartphones, tablets, ultrabooks, netbooks, laptops, multi-processor systems, microprocessor-based or programmable consumer electronics, game consoles, set-top boxes, or any other communication device that a user may use to access a network.

A "communication network" refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

A "component" refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing some operations and may be configured or arranged in a particular physical manner. In various examples, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform some operations as described herein. A hardware component may also be implemented mechanically, electronically, or any suitable combination thereof. For example, a hardware component may include dedicated circuitry or logic that is permanently configured to perform some operations. A hardware component may be a special-purpose processor, such as a field-programmable gate array (FPGA) or an application specific integrated circuit (ASIC). A hardware component may also include programmable logic or circuitry that is temporarily configured by software to perform some operations. For example, a hardware component may include software executed by a general-purpose processor or other programmable processor. Once configured by such software, hardware components become specific machines (or specific components of a machine) tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") is to be understood to encompass a tangible entity, be that an entity that is physically constructed, permanently configured (e.g., hardwired), or temporarily configured (e.g., programmed) to operate in a particular manner or to perform some operations described herein. Considering examples in which hardware components are temporarily configured (e.g., programmed), the hardware components may not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In examples in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be partially processor-implemented, with a particular processor or processors being an example of hardware. For example, some of the operations of a method may be performed by one or more processors or processor-implemented components. Moreover, the one or more processors may also operate to support performance of the relevant operations in a "cloud computing" environment or as a "software as a service" (SaaS). For example, at some of the operations may be performed by a group of computers (as examples of machines including processors), with these operations being accessible via a network (e.g., the Internet) and via one or more appropriate interfaces (e.g., an API). The performance of some of the operations may be distributed among the processors, residing within a single machine as well as being deployed across a number of machines. In some examples, the processors or processor-implemented components may be located in a single geographic location (e.g., within a home environment, an office environment, or a server farm). In other examples, the processors or processor-implemented components may be distributed across a number of geographic locations.

A "computer-readable medium" refers to both machine-storage media and transmission media. Thus, the terms include both storage devices/media and carrier waves/modulated data signals. The terms "machine-readable medium," "computer-readable medium" and "device-readable medium" mean the same thing and may be used interchangeably in this disclosure.

A "machine-storage medium" refers to a single or multiple storage devices and/or media (e.g., a centralized or distributed database, and/or associated caches and servers) that store executable instructions, routines and/or data. The term includes, but not be limited to, solid-state memories, and optical and magnetic media, including memory internal or external to processors. Specific examples of machine-storage media, computer-storage media and/or device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks The terms "machine-storage medium," "device-storage medium," "computer-storage medium" mean the same thing and may be used interchangeably in this disclosure. The terms "machine-storage media," "computer-storage media," and "device-storage media" specifically exclude carrier waves, modulated data signals, and other such media, at some of which are covered under the term "signal medium."

A "processor" refers to any circuit or virtual circuit (a physical circuit emulated by logic executing on an actual processor) that manipulates data values according to control signals (e.g., "commands", "op codes", "machine code", and so forth) and which produces associated output signals that are applied to operate a machine. A processor may, for example, be a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC) or any combination thereof. A processor may further be a multi-core processor having two or more independent processors (sometimes referred to as "cores") that may execute instructions contemporaneously.

A "signal medium" refers to any intangible medium that is capable of storing, encoding, or carrying the instructions for execution by a machine and includes digital or analog communications signals or other intangible media to facilitate communication of software or data. The term "signal medium" may be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

Changes and modifications may be made to the disclosed examples without departing from the scope of the present disclosure. These and other changes or modifications are intended to be included within the scope of the present disclosure, as expressed in the following claims.

What is claimed is:

1. A computing device comprising:
   a camera;
   one or more processors; and
   memory storing instructions that, when executed by the one or more processors, cause the computing device to perform operations comprising:
   capturing, by the camera, one or more images within a field of view of the camera;
   activating an augmented reality (AR) content item that is executed within a client application;
   in response to activating the augmented reality content item, providing a continuous stream of camera data that includes the one or more images to a camera service of a plurality of AR graphics services using one or more first application programming interface (API) calls;
   generating, by the augmented reality content item, one or more second API calls for an object detection service to implement one or more object detection models to detect, in the camera data, one or more objects of interest;
   obtaining, by the augmented reality content item and from the object detection service, first AR graphics display data indicating (i) an AR graphics display surface labeled as a first object of interest within the field of view, (ii) a graphics input tool labeled as a second object of interest, and (iii) a hand grasping the graphics input tool labeled as a third object of interest, wherein the AR graphics display surface includes a surface of one or more physical objects included in an environment in which the computing device is located;
   generating, by the augmented reality content item, one or more third API calls for an object tracking service to implement one or more object tracking models to track, in the camera data, first motion of the graphics input tool and second motion of the hand grasping the graphics input tool;
   obtaining, by the augmented reality content item and from the object tracking service, second AR graphics display data indicating a first path of motion of the graphics input tool based on differences in locations of the graphics input tool across a number of video frames;

obtaining, by the augmented reality content item and from the object tracking service, third AR graphics display data indicating a second path of motion of the hand grasping the graphics input tool based on differences in locations of the hand across the number of video frames;

obtaining, by the augmented reality content item and from the object tracking service, fourth AR graphics display data indicating an angle at which the graphics input tool is being held based on first images of the graphics input tool and second images of the hand grasping the graphics input tool within the number of video frames; and causing, by the augmented reality content item and based on AR graphics display data obtained from the plurality of AR graphics services, display of a user interface overlaid on the AR graphics display surface, the user interface including an AR graphic having at least one of a shape or one or more contours that (i) follow the first path of motion of the graphics input tool and the second path of motion of the hand grasping the graphics input tool and (ii) have a width that is based on the angle at which the graphics input tool is being held.

2. The computing device of claim 1, wherein the computing device is a head-worn device that includes at least one display device and the user interface is displayed by the at least one display device.

3. The computing device of claim 1, wherein the memory stores additional instructions that, when executed by the one or more processors, cause the computing device to perform additional operations comprising:

in response to determining that the graphics input tool is within a threshold distance of the AR graphics display surface, activating one or more features of the augmented reality content item to at least one of create or modify the AR graphic;

determining that the graphics input tool is outside of the threshold distance of the AR graphics display surface; and in response to determining that the graphics input tool is outside of the threshold distance of the AR graphics display surface, deactivating the one or more features of the augmented reality content item.

4. The computing device of claim 1, wherein the memory stores additional instructions that, when executed by the one or more processors, causes the computing device to perform additional operations comprising:

causing an AR graphics menu to be displayed within the user interface, the AR graphics menu including a number of user interface elements, individual user interface elements of the number of user interface elements being selectable to activate one or more features of an augmented reality content item to at least one of create or modify at least a portion of the AR graphic.

5. The computing device of claim 4, wherein the memory stores additional instructions that, when executed by the one or more processors, causes the computing device to perform additional operations comprising:

determining that the graphics input tool is within an additional threshold distance of a user interface element of the number of user interface elements of the AR graphics menu; and causing a feature of the user interface element to be activated.

6. The computing device of claim 1, wherein the memory stores additional instructions that, when executed by the one or more processors, causes the computing device to perform additional operations comprising:

obtaining, based on the camera data, coordinates in real world space for the AR graphics display surface; and determining, based on the camera data, a distance from the camera to the AR graphics display surface.

7. The computing device of claim 6, wherein the memory stores additional instructions that, when executed by the one or more processors, causes the computing device to perform additional operations comprising:

determining that the distance from the camera to the AR graphics display surface has changed from a first distance to a second distance; and modifying a level of magnification of the AR graphic within the user interface based on the distance from the camera to the AR graphics display surface changing from the first distance to the second distance.

8. A computer-implemented method comprising:

capturing, by one or more cameras of one or more computing devices including one or more processors and memory, one or more images within a field of view of the one or more cameras;

activating, by at least one computing device of the one or more computing devices, an augmented reality (AR) content item that is executed within a client application;

in response to activating the augmented reality content item, providing, by at least one computing device of the one or more computing devices, a continuous stream of camera data that includes the one or more images to a camera service of a plurality of AR graphics services using one or more first application programming interface (API) calls;

generating, by the augmented reality content item, one or more second API calls for an object detection service to implement one or more object detection models to detect, in the camera data, one or more objects of interest;

obtaining, by the augmented reality content item and from the object detection service, first AR graphics display data indicating (i) an AR graphics display surface within the field of view, (ii) a graphics input tool labeled as a first object of interest, and (iii) a hand grasping the graphics input tool labeled as a second object of interest, wherein the AR graphics display surface includes a surface of one or more physical objects included in an environment in which the at least one computing device is located;

generating, by the augmented reality content item, one or more third API calls for an object tracking service to implement one or more object tracking models to track, in the camera data, first motion of the graphics input tool and second motion of the hand grasping the graphics input tool;

obtaining, by the augmented reality content item and from the object tracking service, second AR graphics display data indicating a first path of motion of the graphics input tool based on differences in locations of the graphics input tool across a number of video frames;

obtaining, by the augmented reality content item and from the object tracking service, third AR graphics display data indicating a second path of motion of the hand grasping the graphics input tool based on differences in locations of the hand across the number of video frames;

obtaining, by the augmented reality content item and from the object tracking service, fourth AR graphics display data indicating an angle at which the graphics input tool is being held based on first images of the graphics input tool and second images of the hand grasping the graphics input tool within the number of video frames; and causing, by the augmented reality content item and based on AR graphics display data obtained from the plurality of AR graphics services, by at least one computing device of the one or more computing devices, display of a user interface overlaid on the AR graphics display surface, the user interface including an AR graphic having at least one of a shape or one or more contours that (i) follow the first path of motion of the graphics input tool and the second path of motion of the hand grasping the graphics input tool and (ii) have a width that is based on the angle at which the graphics input tool is being held.

9. The computer-implemented method of claim 8, comprising:

determining, by at least one computing device of the one or more computing devices and at a first time, that the AR graphics display surface is not detected within the field of view of the one or more cameras;

responsive to determining that the AR graphics display surface is not detected within the field of view of the one or more cameras at the first time, removing, by at least one computing device of the one or more computing devices, the AR graphic from the user interface;

determining, by at least one computing device of the one or more computing devices and at a second time, that the AR graphics display surface is within the field of view of the one or more cameras; and responsive to determining that the AR graphics display surface is within the field of view of the one or more cameras at the second time, causing, by at least one computing device of the one or more computing devices, the AR graphic to be re-displayed in the user interface.

10. The computer-implemented method of claim 8, comprising:

in response to determining that the graphics input tool is within a threshold distance of the AR graphics display surface, activating, by at least one computing device of the one or more computing devices, one or more features of the augmented reality content item to at least one of create or modify the AR graphic;

determining, by at least one computing device of the one or more computing devices, that the graphics input tool is outside of the threshold distance of the AR graphics display surface; and in response to determining that the graphics input tool is outside of the threshold distance of the AR graphics display surface, deactivating, by at least one computing device of the one or more computing devices, the one or more features of the augmented reality content item.

11. The computer-implemented method of claim 8, comprising:

causing, by at least one computing device of the one or more computing devices, an AR graphics menu to be displayed within the user interface, the AR graphics menu including a number of user interface elements, individual user interface elements of the number of user interface elements being selectable to activate one or more features of an augmented reality content item to at least one of create or modify at least a portion of the AR graphic.

12. The computer-implemented method of claim 11, comprising:

determining, by at least one computing device of the one or more computing devices, that the graphics input tool is within an additional threshold distance of a user interface element of the number of user interface elements of the AR graphics menu; and causing, by at least one computing device of the one or more computing devices, a feature of the user interface element to be activated.

13. The computer-implemented method of claim 8, comprising:

obtaining, by at least one computing device of the one or more computing devices and based on the camera data, coordinates in real world space for the AR graphics display surface; and determining, by at least one computing device of the one or more computing devices and based on the camera data, a distance from the one or more cameras to the AR graphics display surface.

14. The computer-implemented method of claim 13, comprising:

determining, by at least one computing device of the one or more computing devices, that the distance from the one or more cameras to the AR graphics display surface has changed from a first distance to a second distance; and modifying, by at least one computing device of the one or more computing devices, a level of magnification of the AR graphic within the user interface based on the distance from the one or more cameras to the AR graphics display surface changing from the first distance to the second distance.

15. One or more computer-readable storage media storing computer-readable instructions that, when executed by one or more processors, cause the one or more processors to perform operations comprising:

capturing, by one or more cameras of one or more computing devices, one or more images within a field of view of the one or more cameras;

activating an augmented reality (AR) content item that is executed within a client application;

in response to activating the augmented reality content item, providing a continuous stream of camera data that includes the one or more images to a camera service of a plurality of AR graphics services using one or more first application programming interface (API) calls;

generating, by the augmented reality content item, one or more second API calls for an object detection service to implement one or more object detection models to detect, in the camera data, one or more objects of interest;

obtaining, by the augmented reality content item and from the object detection service, first AR graphics display data indicating (i) an AR graphics display surface within the field of view, (ii) a graphics input tool labeled as a first object of interest, and (iii) a hand grasping the graphics input tool labeled as a second object of interest, wherein the AR graphics display surface includes a surface of one or more physical objects included in an environment in which at least one computing device of the one or more computing devices is located;

generating, by the augmented reality content item, one or more third API calls for an object tracking service to implement one or more object tracking models to track, in the camera data, first motion of the graphics input tool and second motion of the hand grasping the graphics input tool;

obtaining, by the augmented reality content item and from the object tracking service, second AR graphics display data indicating a first path of motion of the graphics input tool based on differences in locations of the graphics input tool across a number of video frames;

obtaining, by the augmented reality content item and from the object tracking service, third AR graphics display data indicating a second path of motion of the hand grasping the graphics input tool based on differences in locations of the hand across the number of video frames;

obtaining, by the augmented reality content item and from the object tracking service, fourth AR graphics display data indicating an angle at which the graphics input tool is being held based on first images of the graphics input tool and second images of the hand grasping the graphics input tool within the number of video frames; and causing, by the augmented reality content item and based on AR graphics display data obtained from the plurality of AR graphics services, display of a user interface overlaid on the AR graphics display surface, the user interface including an AR graphic having at least one of a shape or one or more contours that follow (i) the first path of motion of the graphics input tool and the second path of motion of the hand grasping the graphics input tool and (ii) have a width that is based on the angle at which the graphics input tool is being held.

16. The one or more computer-readable storage media of claim 15, storing additional computer-readable instructions that, when executed by one or more processors, cause the one or more processors to perform additional operations comprising:

determining, based on the one or more images, an amount of bending of a tip of the graphics input tool during at least a portion of the first path of motion of the graphics input tool; and based on the amount of bending, determining a width of one or more markings that correspond to the at least one of the shape or one or more contours that follow the first path of motion.

17. The one or more computer-readable storage media of claim 15, storing additional computer-readable instructions that, when executed by one or more processors, cause the one or more processors to perform additional operations comprising:

in response to determining that the graphics input tool is within a threshold distance of the AR graphics display surface, activating one or more features of the augmented reality content item to at least one of create or modify the AR graphic;

determining that the graphics input tool is outside of the threshold distance of the AR graphics display surface; and in response to determining that the graphics input tool is outside of the threshold distance of the AR graphics display surface, deactivating the one or more features of the augmented reality content item.

18. The one or more computer-readable storage media of claim 15, wherein the object detection service determines that an object of interest of a plurality of objects of interest corresponds to the AR graphics display surface based on an analysis of characteristics of the plurality of objects of interest in relation to criteria that are representative of AR graphics display surfaces, the characteristics including one or more minimum dimensions, one or more maximum dimensions, and a maximum amount of surface roughness.

19. The one or more computer-readable storage media of claim 18, wherein the object detection service ranks the plurality of objects of interest in response to the analysis and determines that the AR graphics display surface corresponds to the object of interest of the plurality of objects of interest having a highest ranking.

20. The one or more computer-readable storage media of claim 15, storing additional computer-readable instructions that, when executed by one or more processors, cause the one or more processors to perform additional operations comprising:

obtaining, based on the camera data, coordinates in real world space for the AR graphics display surface; and determining, based on the camera data, a distance from the one or more cameras to the AR graphics display surface;

determining that the distance from the one or more cameras to the AR graphics display surface has changed from a first distance to a second distance; and modifying a level of magnification of the AR graphic within the user interface based on the distance from the one or more cameras to the AR graphics display surface changing from the first distance to the second distance.

* * * * *